US008107531B2

(12) United States Patent
Regunathan et al.

(10) Patent No.: US 8,107,531 B2
(45) Date of Patent: Jan. 31, 2012

(54) SIGNALING AND REPEAT PADDING FOR SKIP FRAMES

(75) Inventors: Shankar Regunathan, Bellevue, WA (US); Chih-Lung Lin, Redmond, WA (US); Thomas W. Holcomb, Bothell, WA (US); Jie Liang, Coquitlam (CA); Ming-Chieh Lee, Bellevue, WA (US); Pohsiang Hsu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 10/987,521

(22) Filed: Nov. 12, 2004

(65) Prior Publication Data

US 2005/0152457 A1 Jul. 14, 2005

Related U.S. Application Data

(63) Continuation-in-part of application No. 10/960,384, filed on Oct. 6, 2004, now Pat. No. 7,822,123, and a continuation-in-part of application No. 10/934,117, filed on Sep. 4, 2004.

(60) Provisional application No. 60/501,081, filed on Sep. 7, 2003.

(51) Int. Cl.
*H04N 7/12* (2006.01)

(52) U.S. Cl. ............................... 375/240.12; 375/240.25

(58) Field of Classification Search ............. 375/240.12, 375/240.25

See application file for complete search history.

(56) References Cited

U.S. PATENT DOCUMENTS

| 4,706,260 A | 11/1987 | Fedele et al. |
| 4,849,812 A | 7/1989 | Borgers et al. |
| 4,954,892 A | 9/1990 | Asai et al. |
| 5,027,206 A | 6/1991 | Vreeswijk et al. |
| 5,091,782 A | 2/1992 | Krause et al. |
| 5,175,618 A | 12/1992 | Ueda et al. |
| 5,191,436 A | 3/1993 | Yonemitsu |
| 5,212,549 A | 5/1993 | Ng et al. |
| 5,223,949 A | 6/1993 | Honjo |
| 5,235,618 A | 8/1993 | Sakai et al. |
| 5,291,486 A | 3/1994 | Koyanagi |
| 5,301,242 A | 4/1994 | Gonzales et al. |
| 5,343,248 A | 8/1994 | Fujinami |

(Continued)

FOREIGN PATENT DOCUMENTS

EP 0599529 6/1994

(Continued)

OTHER PUBLICATIONS

International Standard ISO/IEC 14496-2 Second Edition Dec. 1, 2001. Information technology—Coding of audio-visual objects—Part 2: Visual. p. 144, 201-219.*

(Continued)

*Primary Examiner* — Jayanti K Patel
*Assistant Examiner* — Jessica Prince
(74) *Attorney, Agent, or Firm* — Klarquist Sparkman, LLP

(57) ABSTRACT

A video codec efficiently signals that a frame is identical to its reference frame, such that separate coding of its picture content is skipped. Information that a frame is skipped is represented jointly in a coding table of a frame coding type element for bit rate efficiency in signaling. Further, the video codec signals the picture type (e.g., progressive or interlaced) of skipped frames, which permits different repeat padding methods to be applied according to the picture type.

22 Claims, 21 Drawing Sheets

U.S. PATENT DOCUMENTS

| | | | |
|---|---|---|---|
| 5,365,552 A | 11/1994 | Astle | |
| 5,422,676 A | 6/1995 | Herpel et al. | |
| 5,426,464 A | 6/1995 | Casavant et al. | |
| 5,461,420 A | 10/1995 | Yonemitsu et al. | |
| 5,491,516 A | 2/1996 | Casavant et al. | |
| 5,510,840 A | 4/1996 | Yonemitsu et al. | |
| 5,539,466 A | 7/1996 | Igarashi et al. | |
| 5,541,852 A | 7/1996 | Eyuboglu et al. | |
| 5,543,847 A | 8/1996 | Kato | |
| 5,566,208 A | 10/1996 | Balakrishnan | |
| 5,600,376 A | 2/1997 | Casavant et al. | |
| 5,606,539 A | 2/1997 | De Haan et al. | |
| 5,608,697 A | 3/1997 | De Haan et al. | |
| 5,691,771 A | 11/1997 | Oishi et al. | |
| 5,699,476 A | 12/1997 | Van Der Meer | |
| 5,740,310 A | 4/1998 | De Haan et al. | |
| 5,784,107 A | 7/1998 | Takahashi | |
| RE36,015 E | 12/1998 | Iu | |
| 5,844,867 A | 12/1998 | De Haan et al. | |
| 5,874,995 A | 2/1999 | Naimpally et al. | |
| 5,933,451 A | 8/1999 | Ozkan et al. | |
| 5,946,043 A | 8/1999 | Lee et al. | |
| 5,952,943 A | 9/1999 | Walsh et al. | |
| 5,970,173 A | 10/1999 | Lee et al. | |
| RE36,507 E | 1/2000 | Iu | |
| 6,060,997 A | 5/2000 | Taubenheim et al. | |
| 6,088,063 A | 7/2000 | Shiba | |
| 6,101,195 A | 8/2000 | Lyons et al. | |
| 6,141,053 A | 10/2000 | Saukkonen | |
| 6,160,849 A | 12/2000 | Igarashi et al. | |
| 6,198,773 B1 | 3/2001 | Gill et al. | |
| 6,233,226 B1 | 5/2001 | Gringeri et al. | |
| RE37,222 E | 6/2001 | Yonemitsu et al. | |
| 6,282,245 B1 | 8/2001 | Oishi et al. | |
| 6,295,321 B1* | 9/2001 | Lyu | 375/240.25 |
| 6,324,216 B1 | 11/2001 | Igarashi et al. | |
| 6,370,276 B2 | 4/2002 | Boon | |
| 6,408,096 B2 | 6/2002 | Tan | |
| 6,441,813 B1 | 8/2002 | Ishibashi | |
| 6,459,811 B1 | 10/2002 | Hurst, Jr. | |
| 6,499,060 B1 | 12/2002 | Wang et al. | |
| 6,556,627 B2 | 4/2003 | Kitamura et al. | |
| 6,593,392 B2 | 7/2003 | Wang et al. | |
| 6,654,420 B1 | 11/2003 | Snook | |
| 6,671,323 B1* | 12/2003 | Tahara et al. | 375/240.26 |
| 6,728,317 B1 | 4/2004 | Demos | |
| 6,775,840 B1 | 8/2004 | Naegel et al. | |
| 6,792,048 B1 | 9/2004 | Lee et al. | |
| 6,842,485 B2 | 1/2005 | Monda et al. | |
| 6,873,629 B2 | 3/2005 | Morris | |
| 7,010,046 B2* | 3/2006 | Trevers et al. | 375/240.29 |
| 7,064,790 B1 | 6/2006 | Varma et al. | |
| 7,227,895 B1 | 6/2007 | Wang et al. | |
| 7,298,303 B2 | 11/2007 | Kobayashi et al. | |
| 7,609,762 B2 | 10/2009 | Crinon et al. | |
| 2001/0010708 A1 | 8/2001 | Nakazawa | |
| 2001/0055469 A1 | 12/2001 | Shida et al. | |
| 2002/0001348 A1 | 1/2002 | Yiwen et al. | |
| 2002/0012394 A1 | 1/2002 | Hatano et al. | |
| 2002/0061067 A1 | 5/2002 | Lyons et al. | |
| 2002/0061073 A1 | 5/2002 | Huang et al. | |
| 2002/0080875 A1 | 6/2002 | Tahara et al. | |
| 2002/0191712 A1 | 12/2002 | Gaddam et al. | |
| 2002/0196857 A1 | 12/2002 | Kono et al. | |
| 2003/0053416 A1 | 3/2003 | Ribas-Corbera et al. | |
| 2003/0113026 A1* | 6/2003 | Srinivasan et al. | 382/239 |
| 2003/0137600 A1 | 7/2003 | Chen et al. | |
| 2003/0185298 A1* | 10/2003 | Alvarez et al. | 375/240.03 |
| 2003/0202590 A1* | 10/2003 | Gu et al. | 375/240.13 |
| 2003/0231593 A1 | 12/2003 | Bauman et al. | |
| 2004/0042673 A1* | 3/2004 | Boon | 382/239 |
| 2004/0130619 A1 | 7/2004 | Lin | |
| 2004/0142699 A1 | 7/2004 | Jollota et al. | |
| 2004/0255063 A1 | 12/2004 | Crinon et al. | |
| 2005/0074061 A1 | 4/2005 | Ribas-Corbera et al. | |
| 2005/0083218 A1 | 4/2005 | Regunathan et al. | |
| 2005/0100093 A1 | 5/2005 | Holcomb | |
| 2005/0135484 A1 | 6/2005 | Lee et al. | |
| 2005/0147167 A1 | 7/2005 | Dumitras et al. | |
| 2005/0200758 A1 | 9/2005 | Monahan et al. | |
| 2006/0013568 A1 | 1/2006 | Rodriguez | |
| 2006/0143678 A1 | 6/2006 | Chou et al. | |
| 2007/0153918 A1 | 7/2007 | Rodriguez | |

FOREIGN PATENT DOCUMENTS

| | | |
|---|---|---|
| EP | 0 852 445 | 8/1998 |
| JP | 62032725 | 2/1987 |
| JP | 1049388 | 2/1989 |
| JP | 4207684 | 7/1992 |
| JP | 04-297179 | 10/1992 |
| JP | 5236457 | 9/1993 |
| JP | 6030394 | 2/1994 |
| JP | 08-223385 | 8/1996 |
| JP | 09-261266 | 10/1997 |
| JP | 10-294757 | 11/1998 |
| JP | 2000165866 | 6/2000 |
| JP | 2000-286865 | 10/2000 |
| JP | 2001-109686 | 4/2001 |
| JP | 2001-169261 | 6/2001 |
| KR | 10-2001-39215 | 5/2001 |
| WO | 00/30356 | 5/2000 |

OTHER PUBLICATIONS

"DivX Multi Standard Video Encoder," 2 pp. (Downloaded from the World Wide Web on Jan. 24, 2006).

Sullivan et al., "The H.264/AVC Advanced Video Coding Standard: Overview and Introduction to the Fidelity Range Extensions," 21 pp. (Aug. 2004).

Wien, "Variable Block-Size Transforms for Hybrid Video Coding," Dissertation, 182 pp. (Feb. 2004).

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Borgwardt, "Core Experiment on Interlaced Video Coding," ITU Study Group 16 Question 16, VCEG-N85, 10 pp. (Oct. 2001).

Chen et al., "Source Model for Transform Video Coder and Its Application—Part II: Variable Frame Rate Coding," *IEEE Transactions on Circuits and Systems for Video Technology*, vol. 7, No. 2, pp. 299-311 (Apr. 1997).

Hsu et al., "Joint Selection of Source and Channel Rate for VBR Video Transmission Under ATM Policing Constraints," *IEEE Journal on Selected Areas in Communication*, vol. 15, No. 6, pp. 1016-1028 (Aug. 1997).

ISO/IEC 13818-1, "MPEG-2 Systems—Coding of Moving Pictures and Associated Audio," 129 pp. (Mar. 1994).

ISO/IEC 13818-1, "MPEG-2 Systems—Coding of Moving Pictures and Associated Audio," second edition, 171 pp. (Dec. 2000).
ISO/IEC JVT-D131, "HRD and Related Issues," 5 pp. (Jul. 2002).
ISO/IEC JVT-G050r1 (Draft ITU-T Rec. H.264), "Joint Video Specification," 268 pp. (May 2003).
ISO/IEC JVT-E133, "Time—Shift Causality Constraint on the CAT-LB HRD," 8 pp. (Oct. 2002).
ITU-T Recommendation H.263, "Draft H.263," International Telecommunication Union, pp. 5, 46, 47 (Jan. 1998).
ITU-Telecommunications Standardization Sector, VCEG-N58, "A Generalized Hypothetical Reference Decoder for H.26L," 14 pp. (Sep. 2001).
Jenkac et al., "On Video Streaming over Variable Bit-rate and Wireless Channels," presented at Packet Video 2003, 11 pp. (Apr. 28-29, 2003).
Joint Video Team of ISO/IEC MPEG and ITU-T VCEG, "Final Joint Committee Draft of Joint Video Specification (ITU-T Recommendation H.264, ISO/IEC 14496-10 AVC)," 206 pp. (Aug. 2002).
Joint Video Team (JVT) of ISO/IEC MPEG & ITU-T VCEG, ISO/IEC JVT-E075, "HRD Clean-up," 7 pp. (Oct. 2002).
Pao et al., "Encoding Stored Video for Streaming Applications," *IEEE Transactions on Circuits and Systems for Video Technology*, vol. 11, No. 2, pp. 199-209 (Feb. 2001).
Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).
Reibman et al., "Constraints on Variable Bit-Rate Video for ATM Networks," *IEEE Transactions on Circuits and Systems for Video Technology*, vol. 2, No. 4, pp. 361-372 (Dec. 1992).
Ribas-Corbera et al., A Generalized Hypothetical Reference Decoder for H.26L (proposal) ITU Study Group 16 Question 6 (Q.6/SG16), VCEG, VCEG-N58, 14th Meeting, Santa Barbara, CA, Sep. 2001.
Ribas-Corbera et al., "A Generalized Hypothetical Reference Decoder for H.264/AVC," *IEEE Transactions on Circuits and Systems for Video Technology*, vol. 13, No. 7, 14 pp. (Jul. 2003).
Sheu et al., "A Buffer Allocation Mechanism for VBR Video Playback," Communication Tech. Proc. 2000, WCC-ICCT 2000, vol. 2, pp. 1641-1644 (Aug. 2000).
SMPTE, "Proposed SMPTE Standard for Television: VC-9 Compressed Video Bitstream Format and Decoding Process," Working Draft 2 (Oct. 2003).
Walpole et al., "A Player for Adaptive MPEG Video Streaming over the Internet," *Proc. SPIE*, vol. 3240, pp. 270-281 (Mar. 1998).
Wang et al., "Research on HDTV decoder synchronization system," *IEEE*, pp. 868-870 (Dec. 2000).
AVC-362, "Picture Header of Skipped Picture," 2 pp. (1992).

\* cited by examiner

Figure 1, prior art
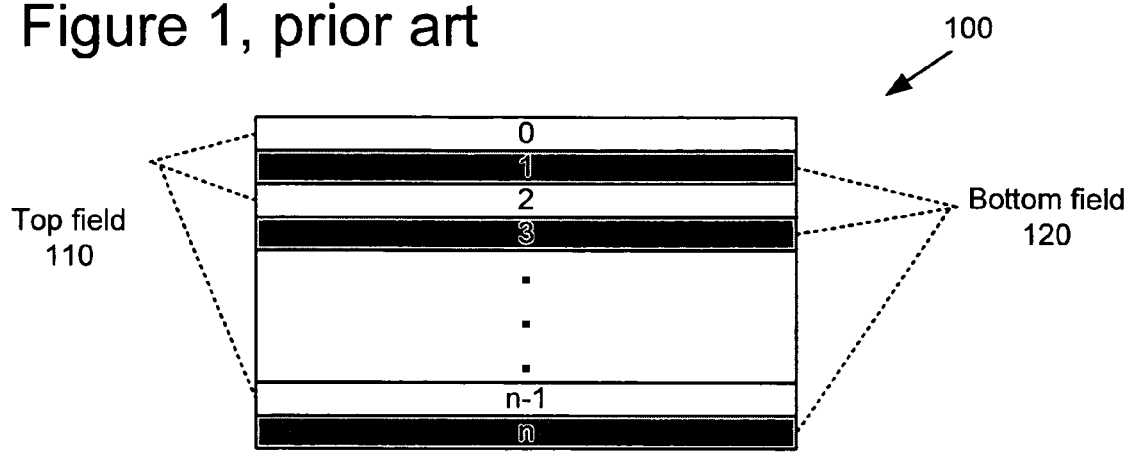
Figure 2
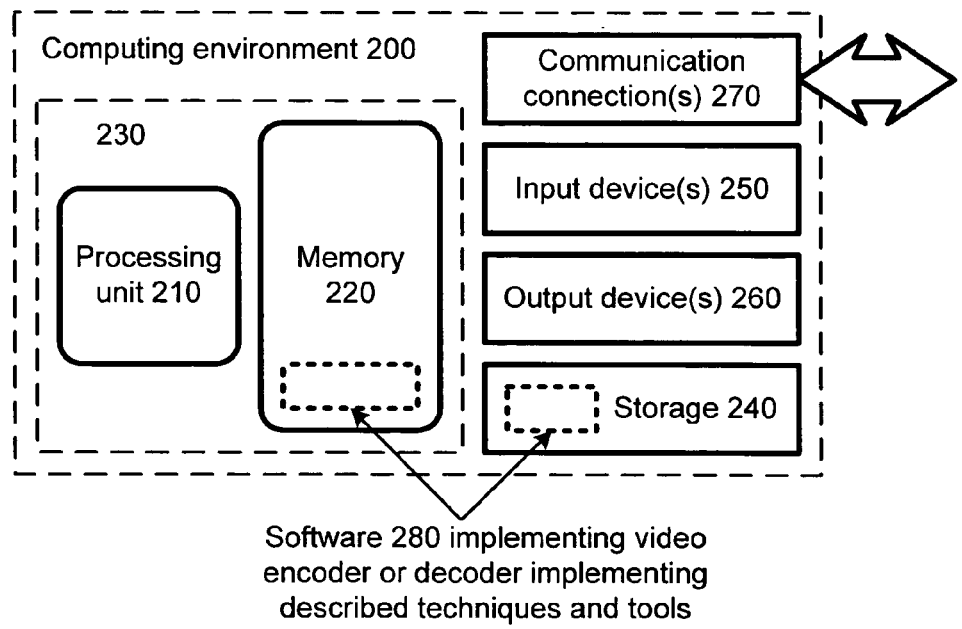

Top field ▨
Bottom field ▰

Top field ▨
Bottom field ▰

Top field ▨
Bottom field ▰

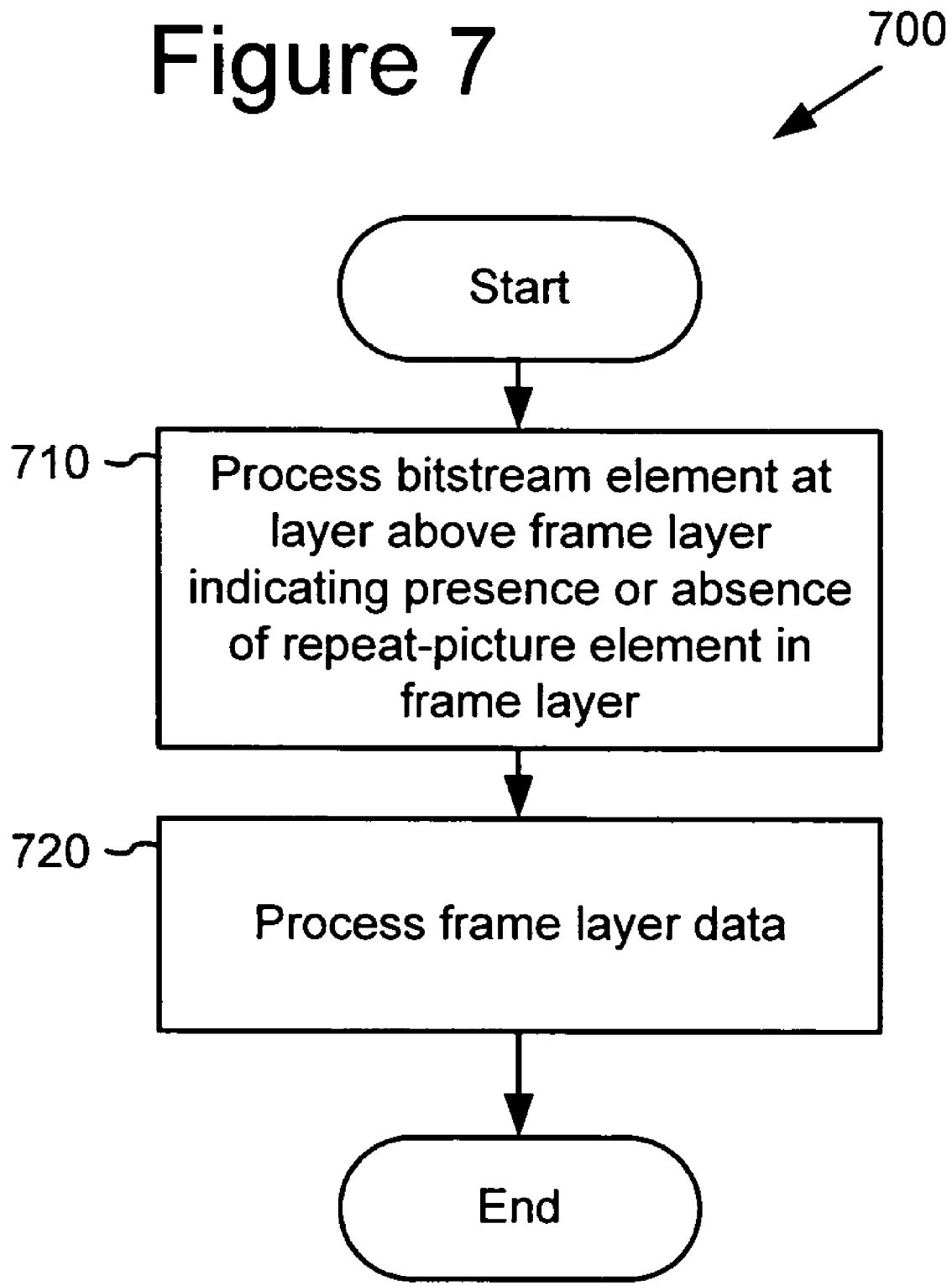

Frame Layer Progressive P-frame Bitstream Syntax 1000

Frame Layer Skipped Frame Bitstream Syntax 1200

Frame Layer Interlace I-frame Bitstream Syntax 1400

Frame Layer Interlace P-frame Bitstream Syntax 1500

```
If (INTERLACE == 1)
{
   If (PULLDOWN == 1)
   {
      NumberOfPanScanWindows = 2 + RFF
   }
   else
   {
      NumberOfPanScanWindows = 2
   }
}
else
{
   If (PULLDOWN == 1)
   {
      NumberOfPanScanWindows = 1 + RPTFRM
   }
   else
   {
      NumberOfPanScanWindows = 1
   }
}
```

```
//Decode true frame size (coded_width and coded_height)
from entry-point header padded_width = (Integer) (coded_width + 15) / 16;

if (frame_type == progressive) {
    padded_height = (Integer) (coded_height + 15) / 16;
} else {
    padded_height = (Integer) (coded_height + 31) / 32;
}
```

SIGNALING AND REPEAT PADDING FOR SKIP FRAMES

RELATED APPLICATION INFORMATION

This application is a continuation-in-part of U.S. patent application Ser. No. 10/934,117, entitled, "SIGNALING FOR FIELD ORDERING AND FIELD/FRAME DISPLAY REPETITION," filed Sep. 4, 2004, which application claims the benefit of U.S. Provisional Patent Application No. 60/501,081, entitled "Video Encoding and Decoding Tools and Techniques," filed Sep. 7, 2003, both of which are hereby incorporated by reference.

This application also is a continuation-in-part of U.S. patent application Ser. No. 10/960,384, entitled, "EFFICIENT REPEAT PADDING FOR HYBRID VIDEO SEQUENCE WITH ARBITRARY VIDEO RESOLUTION," filed Oct. 6, 2004, which is hereby incorporated by reference.

TECHNICAL FIELD

The technical field relates to video coding and decoding, and more particularly to signaling and repeat padding of skipped frames in coding and decoding of skipped frames in a video sequence.

BACKGROUND

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks (CDs) have capacities of about 0.6 gigabytes, magnetic hard disks have capacities of 1-2 gigabytes, and compact optical disks under development have capacities of up to 8 gigabytes.

To address the limitations in storing or transmitting such massive amounts of digital video information, various video compression standards or processes have been established, including MPEG-1, MPEG-2, and H.26X. These video compression techniques utilize similarities between successive image frames, referred to as temporal or interframe correlation, to provide interframe compression in which motion data and error signals are used to encode changes between frames.

In addition, the conventional video compression techniques utilize similarities within image frames, referred to as spatial or intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Interframe compression typically utilizes motion estimation and compensation to encode scene changes between frames. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the pixel locations of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal. Since the error signal is just an array of values representing the difference between image sample values, it can be compressed using the same texture coding method as used for intraframe coding of image samples.

I. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 1, an interlaced video frame 100 includes top field 110 and bottom field 120. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

II. Display Ordering and Pull-down

The order in which decoded pictures are displayed is called the display order. The order in which the pictures are transmitted and decoded is called the coded order. The coded order is the same as the display order if there are no B-frames in the sequence. However, if B-frames are present, the coded order may not be the same as the display order because B-frames typically use temporally future reference frames as well as temporally past reference frames.

Pull-down is a process where video frame rate is artificially increased through repeated display of the same decoded frames or fields in a video sequence. Pull-down is typically performed in conversions from film to video or vice versa, or in conversions between video formats having different frame rates. For example, pull-down is performed when 24-frame-per-second film is converted to 30-frame-per-second or 60-frame-per-second video.

III. Standards for Video Compression and Decompression

Several international standards relate to video compression and decompression. These standards include the Motion Picture Experts Group ["MPEG"] 1, 2, and 4 standards and the H.261, H.262 (another title for MPEG 2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression.

A. Signaling for Field Ordering and Field/Frame Repetition in the Standards

Some international standards describe bitstream elements for signaling field display order and for signaling whether certain fields or frames are to be repeated during display. The H.262 standard uses picture coding extension elements top_field_first and repeat_first_field to indicate field display order and field display repetition. When the sequence extension syntax element progressive_sequence is set to 1 (indicating the coded video sequence contains only progressive frames), top_field_first and repeat_first_field indicate how many times a reconstructed frame is to be output (i.e., once, twice or three times) by an H.262 decoder. When progressive$_{13}$ sequence is 0 (indicating the coded video sequence many contain progressive or interlaced frames (frame-coded or field-coded)), top_field_first indicates which field of a reconstructed frame the decoder outputs first, and repeat_first_field indicates whether the first field in the frame is to be repeated in the output of the decoder.

The MPEG 4 standard describes a top_field_first element for indicating field display order. In MPEG 4, top_field_first is a video object plane syntax element that indicates which field (top or bottom) of a reconstructed video object plane the decoder outputs first.

According to draft JVT-d157of the JVT/AVC video standard, the slice header element pic_structure takes on one of five values to identify a picture as being one of five types: progressive frame, top field, bottom field, interlaced frame with top field first in time, or interlaced frame with bottom field first in time.

B. Limitations of the Standards

These international standards are limited in that they do not allow for signaling to indicate the presence or absence of bitstream elements for (1) signaling field display order and (2) signaling whether certain fields or frames are to be repeated during display. For example, although the H.262 standard uses picture coding extension elements top_field_first and repeat_first_field, the H.262 standard does not have a mechanism to "turn off" such elements when they are not needed.

Given the critical importance of video compression and decompression to digital video, it is not surprising that video compression and decompression are richly developed fields. Whatever the benefits of previous video compression and decompression techniques, however, they do not have the advantages of the following techniques and tools.

IV. Repeat Padding

As previously remarked, interframe compression typically is performed by performing motion estimation and prediction for the macroblocks in a predicted frame with respect to a reference intra-coded frame. Some previously existing video systems have permitted the motion estimation to extend beyond the active picture contents of the reference intra-coded frame. In some such cases, the video systems have derived the "content" outside the picture by repeating the pixels of the picture edge to "fill" an extended region that may be used for motion estimation purposes. For example, the bottom row of the picture is repeated to vertically expand the picture downward to fill an extended motion estimation region below the picture. Likewise, the top row, left and right columns are repeated at top left and right sides to provide extended motion estimation regions at those sides of the reference picture. This process of filling areas outside the active picture content is sometimes referred to as "repeat padding."

SUMMARY

Various video codec tools and techniques described herein provide for efficient signaling and repeat padding of skipped frames. More particularly, the described video codec efficiently signal that a frame is identical to its reference frame, and therefore coding of its picture content is skipped.

In one aspect of the efficient skip frame signaling method described herein, information signaling that a frame is skipped is combined with information of the frame type to achieve bit rate coding efficiency. This combination of signaling skip frame and frame type information permits different repeat padding methods to be applied to the skip frame according to its frame type. In one described example implementation, two types of skipped frames can be signaled: progressive skip, and interlace frame skip. Progressive repeat padding is then applied to progressive type skip frames, while interlace repeat padding is applied to skip frames that are of the interlace type. For example, the repeat padding of progressive pictures is done by repeating the edges of the active video boundary to expand out from the active video region. Repeat padding of interlaced content pictures, on the other hand, is accomplished by repeating the last two edges rows of the active video (i.e., the last row of each interlaced field) to pad the picture vertically, whereas the edge column is repeated to pad horizontally. The different progressive and interlace repeat padding has the benefit of serving as better prediction area for the following frames.

Additional features and advantages will be made apparent from the following detailed description of different embodiments that proceeds with reference to the accompanying drawings.

BRIEF DESCRIPTION OF THE DRAWINGS

FIG. 1 is a diagram showing an interlaced frame according to the prior art.

FIG. 2 is a block diagram of a suitable computing environment in conjunction with which several described embodiments may be implemented.

FIG. 7 is a flow chart showing a technique for processing frame data where the presence or absence of repeat-picture elements is signaled in a bitstream.

FIG. 18 is a code diagram showing pseudo-code for determining a number of pan/scan windows in a combined implementation.

FIG. 23 is a pseudo-code listing of program code for calculating padded height and width of pictures in a hybrid video sequence.

DETAILED DESCRIPTION

Figure 3:
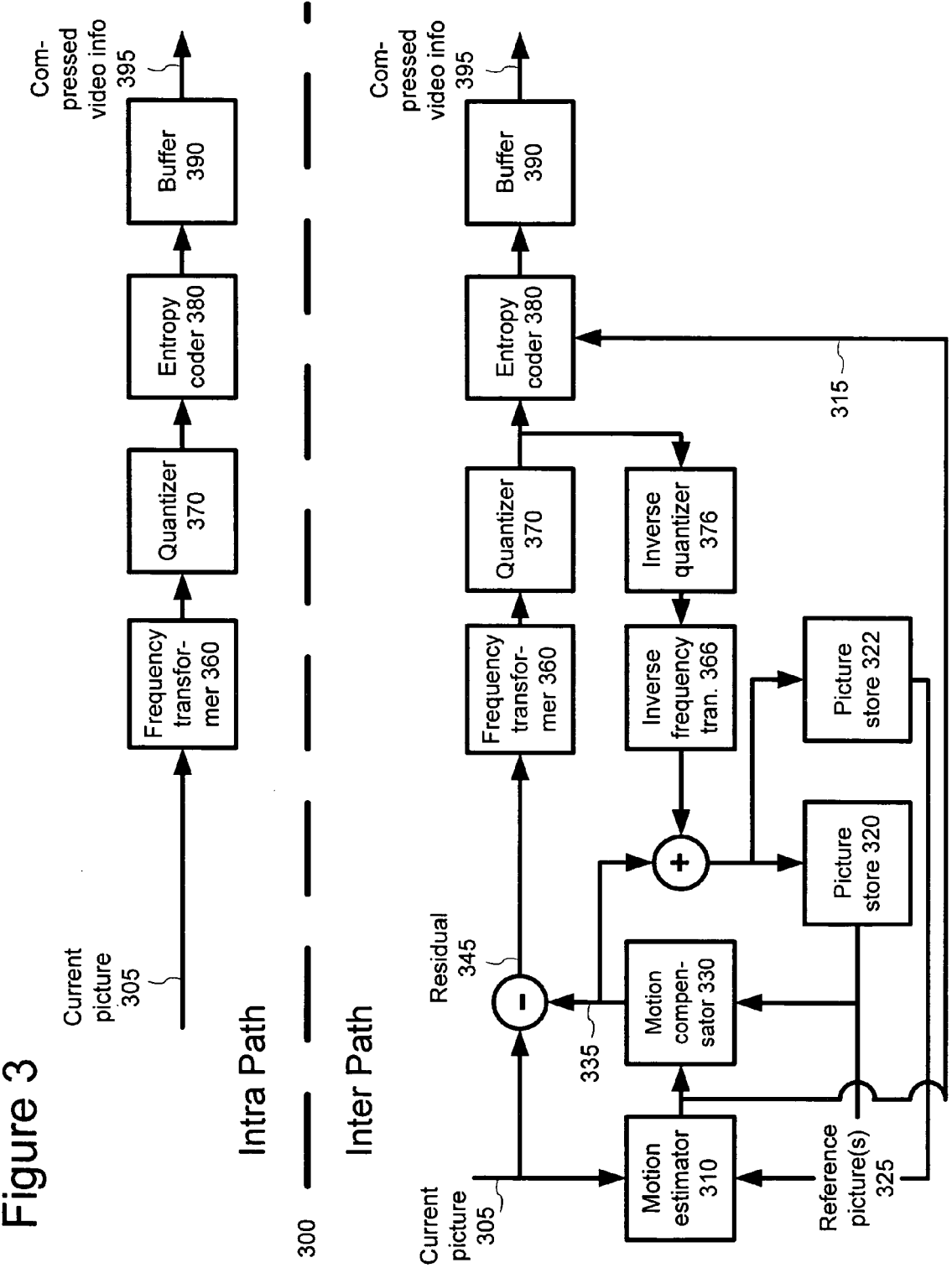
FIG. 3 is a block diagram of a generalized video encoder system in conjunction with which several described embodiments may be implemented.

The present application relates to techniques and tools for efficient compression and decompression of interlaced and progressive video. In various described embodiments, a video encoder and decoder incorporate techniques for encoding and decoding interlaced and progressive video, and corresponding signaling techniques for use with a bitstream format or syntax comprising different layers or levels (e.g., sequence level, entry point level, frame level, field level, slice level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

FIG. 2 illustrates a generalized example of a suitable computing environment 200 in which several of the described embodiments may be implemented. The computing environment 200 is not intended to suggest any limitation as to scope of use or functionality, as the techniques and tools may be implemented in diverse general-purpose or special-purpose computing environments.

With reference to FIG. 2, the computing environment 200 includes at least one processing unit 210 and memory 220. In FIG. 2, this most basic configuration 230 is included within a dashed line. The processing unit 210 executes computer-executable instructions and may be a real or a virtual processor. In a multi-processing system, multiple processing units execute computer-executable instructions to increase processing power. The memory 220 may be volatile memory (e.g., registers, cache, RAM), non-volatile memory (e.g., ROM, EEPROM, flash memory, etc.), or some combination of the two. The memory 220 stores software 280 implementing a video encoder or decoder with one or more of the described techniques and tools.

A computing environment may have additional features. For example, the computing environment 200 includes storage 240, one or more input devices 250, one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, DVDs, or any other medium which can be used to store information and which can be accessed within the computing environment 200. The storage 240 stores instructions for the software 280 implementing the video encoder or decoder.

The input device(s) 250 may be a touch input device such as a keyboard, mouse, pen, or trackball, a voice input device, a scanning device, or another device that provides input to the computing environment 200. For audio or video encoding, the input device(s) 250 may be a sound card, video card, TV tuner card, or similar device that accepts audio or video input in analog or digital form, or a CD-ROM or CD-RW that reads audio or video samples into the computing environment 200.

The output device(s) 260 may be a display, printer, speaker, CD-writer, or another device that provides output from the computing environment 200.

The communication connection(s) 270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 200, computer-readable media include memory 220, storage 240, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "predict," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 4:
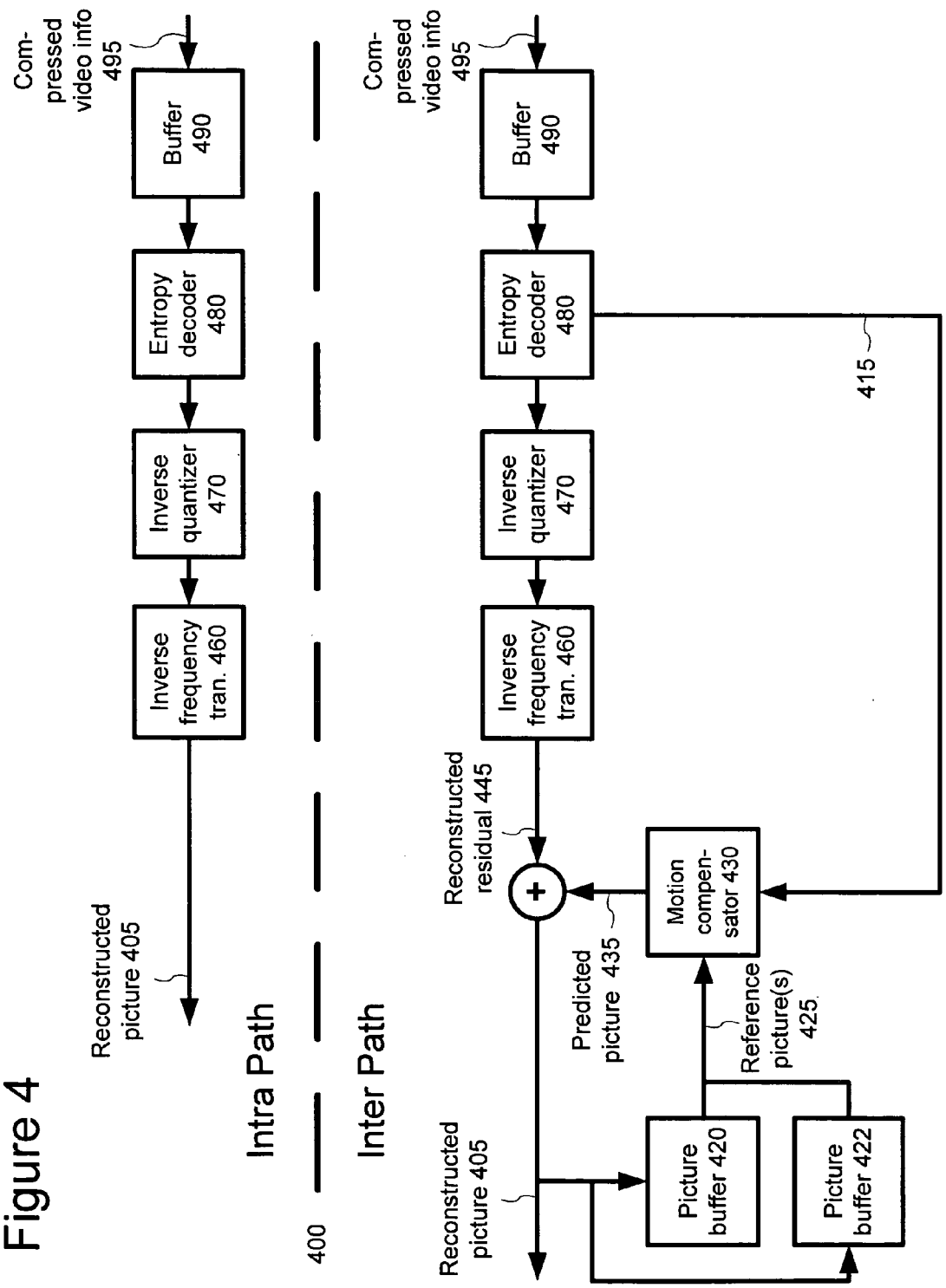
FIG. 4 is a block diagram of a generalized video decoder system in conjunction with which several described embodiments may be implemented.

FIG. 3 is a block diagram of a generalized video encoder 300 in conjunction with which some described embodiments may be implemented. FIG. 4 is a block diagram of a generalized video decoder 400 in conjunction with which some described embodiments may be implemented.

The relationships shown between modules within the encoder 300 and decoder 400 indicate general flows of information in the encoder and decoder; other relationships are not shown for the sake of simplicity. In particular, FIGS. 3 and 4 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 300 and decoder 400 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 300 and decoder 400 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 300 and decoder 400 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 300 and decoder 400 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 500 shown in FIG. 5. The macroblock 500 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 6A:
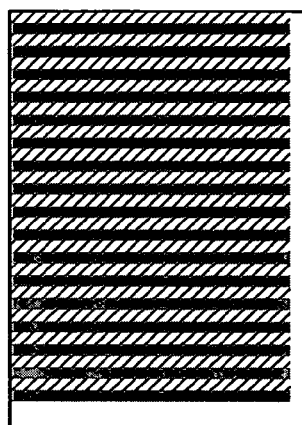
FIG. 6A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 6A shows part of an interlaced video frame 600, including the alternating lines of the top field and bottom field at the top left part of the interlaced video frame 600.

Figure 5:
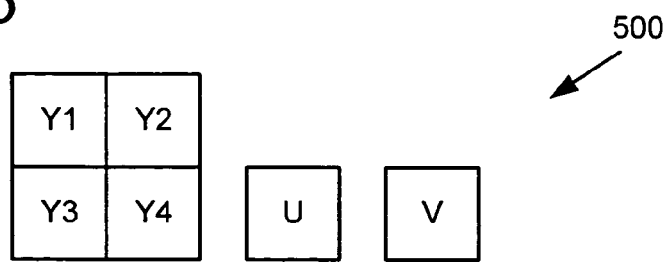
FIG. 5 is a diagram of a macroblock format used in several described embodiments.
Figure 6B:
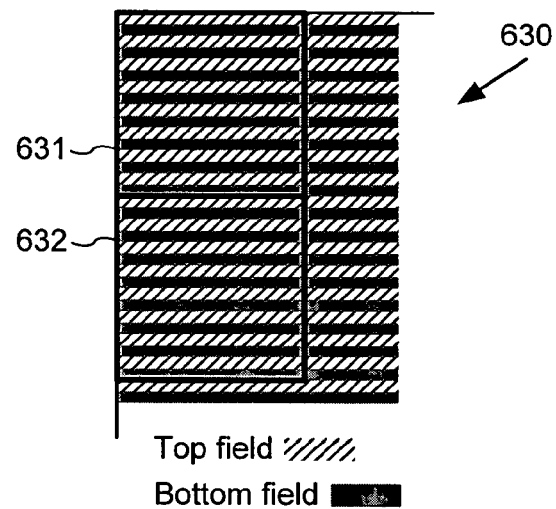
FIG. 6B is a diagram of the interlaced video frame organized for encoding/decoding as a frame.

FIG. 6B shows the interlaced video frame 600 of FIG. 6A organized for encoding/decoding as a frame 630. The interlaced video frame 600 has been partitioned into macroblocks such as the macroblocks 631 and 632, which use a 4:2:0 format as shown in FIG. 5. In the luminance plane, each macroblock 631, 632 includes 8 lines from the top field alternating with 8 lines from the bottom field for 16 lines total, and each line is 16 pixels long. (The actual organization and placement of luminance blocks and chrominance blocks within the macroblocks 631, 632 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 6C:
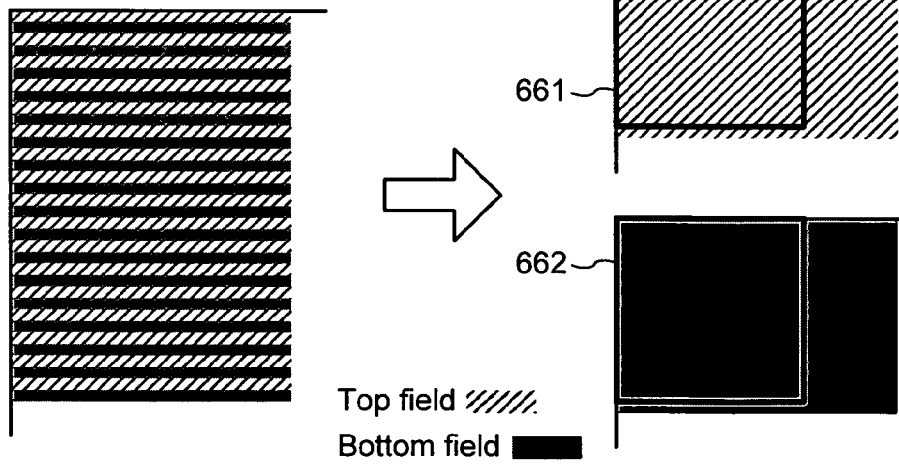
FIG. 6C is a diagram of the interlaced video frame organized for encoding/decoding as fields.

FIG. 6C shows the interlaced video frame 600 of FIG. 6A organized for encoding/decoding as fields 660. Each of the two fields of the interlaced video frame 600 is partitioned into macroblocks. The top field is partitioned into macroblocks such as the macroblock 661, and the bottom field is partitioned into macroblocks such as the macroblock 662. (Again, the macroblocks use a 4:2:0 format as shown in FIG. 5, and the organization and placement of luminance blocks and chrominance blocks within the macroblocks are not shown.) In the luminance plane, the macroblock 661 includes 16 lines from the top field and the macroblock 662 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bidirectional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

A predicted picture that is identical to its reference frame is called a skipped picture. The reconstruction of the skipped picture is equivalent conceptually to copying the reference frame. In general, a signal indicating a skipped picture means that no further image data is transmitted for this frame. Additional data may still be sent relating to, for example, field/frame display repetition, which is described in further detail below.

Alternatively, the encoder 300 and decoder 400 are object-based, use a different macroblock or block format, or perform operations on sets of pixels of different size or configuration than 8×8 blocks and 16×16 macroblocks.

B. Video Encoder

FIG. 3 is a block diagram of a generalized video encoder system 300. The encoder system 300 receives a sequence of video pictures including a current picture 305 (e.g., progressive video frame, interlaced video frame, or field of an interlaced video frame), and produces compressed video information 395 as output. Particular embodiments of video encoders typically use a variation or supplemented version of the generalized encoder 300.

The encoder system 300 compresses predicted pictures and key pictures. For the sake of presentation, FIG. 3 shows a path for key pictures through the encoder system 300 and a path for predicted pictures. Many of the components of the encoder system 300 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 305 is a forward-predicted picture, a motion estimator 310 estimates motion of macroblocks or other sets of pixels of the current picture 305 with respect to one or more reference pictures, for example, the reconstructed previous picture 325 buffered in the picture store 320. If the current picture 305 is a bi-directionally-predicted picture, a motion estimator 310 estimates motion in the current picture 305 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 300 can use the separate stores 320 and 322 for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882,135, entitled, "Advanced Bi-Directional Predictive Coding of Interlaced Video," filed Jun. 29, 2004.

The motion estimator 310 can estimate motion by pixel, ½ pixel, ¼ pixel, or other increments, and can switch the precision of the motion estimation on a picture-by-picture basis or other basis. The motion estimator 310 (and compensator 330) also can switch between types of reference picture pixel interpolation (e.g., between bicubic and bilinear) on a per-frame or other basis. The precision of the motion estimation can be the same or different horizontally and vertically. The motion estimator 310 outputs as side information motion information 315 such as differential motion vector information. The encoder 300 encodes the motion information 315 by, for example, computing one or more predictors for motion vectors, computing differentials between the motion vectors and predictors, and entropy coding the differentials. To reconstruct a motion vector, a motion compensator 330 combines a predictor with differential motion vector information.

The motion compensator 330 applies the reconstructed motion vector to the reconstructed picture(s) 325 to form a motion-compensated current picture 335. The prediction is rarely perfect, however, and the difference between the motion-compensated current picture 335 and the original current picture 305 is the prediction residual 345. During later reconstruction of the picture, the prediction residual 345 is added to the motion compensated current picture 335 to obtain a reconstructed picture that is closer to the original current picture 305. In lossy compression, however, some information is still lost from the original current picture 305. Alternatively, a motion estimator and motion compensator apply another type of motion estimation/compensation.

A frequency transformer 360 converts the spatial domain video information into frequency domain (i.e., spectral) data. For block-based video pictures, the frequency transformer 360 applies a DCT, variant of DCT, or other block transform to blocks of the pixel data or prediction residual data, producing blocks of frequency transform coefficients. Alternatively, the frequency transformer 360 applies another conventional frequency transform such as a Fourier transform or uses wavelet or sub-band analysis. The frequency transformer 360 may apply an 8×8, 8×4, 4×8, 4×4 or other size frequency transform.

A quantizer 370 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 300 can use frame dropping, adaptive filtering, or other techniques for rate control.

The encoder 300 may use special signaling for a skipped macroblock, which is a macroblock that has no information of certain types (e.g., no differential motion vectors for the macroblock and no residual information).

When a reconstructed current picture is needed for subsequent motion estimation/compensation, an inverse quantizer 376 performs inverse quantization on the quantized spectral data coefficients. An inverse frequency transformer 366 then performs the inverse of the operations of the frequency transformer 360, producing a reconstructed prediction residual (for a predicted picture) or a reconstructed key picture. If the current picture 305 was a key picture, the reconstructed key picture is taken as the reconstructed current picture (not shown). If the current picture 305 was a predicted picture, the reconstructed prediction residual is added to the motion-compensated current picture 335 to form the reconstructed current picture. One or both of the picture stores 320, 322 buffers the reconstructed current picture for use in motion compensated prediction. In some embodiments, the encoder applies a de-blocking filter to the reconstructed frame to adaptively smooth discontinuities and other artifacts in the picture.

The entropy coder 380 compresses the output of the quantizer 370 as well as certain side information (e.g., motion information 315, quantization step size). Typical entropy coding techniques include arithmetic coding, differential coding, Huffman coding, run length coding, LZ coding, dictionary coding, and combinations of the above. The entropy coder 380 typically uses different coding techniques for different kinds of information (e.g., DC coefficients, AC coefficients, different kinds of side information), and can choose from among multiple code tables within a particular coding technique.

The entropy coder 380 provides compressed video information 395 to the multiplexer ["MUX"] 390. The MUX 390 may include a buffer, and a buffer level indicator may be fed back to bit rate adaptive modules for rate control. Before or after the MUX 390, the compressed video information 395 can be channel coded for transmission over the network. The channel coding can apply error detection and correction data to the compressed video information 395.

C. Video Decoder

FIG. 4 is a block diagram of a general video decoder system 400. The decoder system 400 receives information 495 for a compressed sequence of video pictures and produces output including a reconstructed picture 405 (e.g., progressive video frame, interlaced video frame, or field of an interlaced video frame). Particular embodiments of video decoders typically use a variation or supplemented version of the generalized decoder 400.

The decoder system 400 decompresses predicted pictures and key pictures. For the sake of presentation, FIG. 4 shows a path for key pictures through the decoder system 400 and a path for forward-predicted pictures. Many of the components of the decoder system 400 are used for decompressing both key pictures and predicted pictures. The exact operations performed by those components can vary depending on the type of information being decompressed.

A DEMUX 490 receives the information 495 for the compressed video sequence and makes the received information available to the entropy decoder 480. The DEMUX 490 may include a jitter buffer and other buffers as well. Before or after the DEMUX 490, the compressed video information can be channel decoded and processed for error detection and correction.

The entropy decoder 480 entropy decodes entropy-coded quantized data as well as entropy-coded side information (e.g., motion information 415, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 480 typically uses different decoding techniques for different kinds of information (e.g., DC coefficients, AC coefficients, different kinds of side information), and can choose from among multiple code tables within a particular decoding technique.

The decoder 400 decodes the motion information 415 by, for example, computing one or more predictors for motion vectors, entropy decoding differential motion vectors, and combining decoded differential motion vectors with predictors to reconstruct motion vectors.

A motion compensator 430 applies motion information 415 to one or more reference pictures 425 to form a prediction 435 of the picture 405 being reconstructed. For example, the motion compensator 430 uses one or more macroblock motion vector to find macroblock(s) in the reference picture(s) 425. One or more picture stores (e.g., picture store 420, 422) store previous reconstructed pictures for use as reference pictures. Typically, B-pictures have more than one reference picture (e.g., at least one temporally previous reference picture and at least one temporally future reference picture). Accordingly, the decoder system 400 can use separate picture stores 420 and 422 for multiple reference pictures. The motion compensator 430 can compensate for motion at pixel, ½ pixel, ¼ pixel, or other increments, and can switch the precision of the motion compensation on a picture-by-picture basis or other basis. The motion compensator 430 also can switch between types of reference picture pixel interpolation (e.g., between bicubic and bilinear) on a per-frame or other basis. The precision of the motion compensation can be the same or different horizontally and vertically. Alternatively, a motion compensator applies another type of motion compensation. The prediction by the motion compensator is rarely perfect, so the decoder 400 also reconstructs prediction residuals.

An inverse quantizer 470 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 460 converts the quantized, frequency domain data into spatial domain video information. For block-based video pictures, the inverse frequency transformer 460 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 460 applies another conventional inverse frequency transform such as an inverse Fourier transform or uses wavelet or sub-band synthesis. The inverse frequency transformer 460 may apply an 8×8, 8×4, 4×8, 4×4, or other size inverse frequency transform.

For a predicted picture, the decoder 400 combines the reconstructed prediction residual 445 with the motion compensated prediction 435 to form the reconstructed picture 405. When the decoder needs a reconstructed picture 405 for subsequent motion compensation, one or both of the picture stores (e.g., picture store 420) buffers the reconstructed picture 405 for use in predicting the next picture. In some embodiments, the decoder 400 applies a de-blocking filter to the reconstructed picture to adaptively smooth discontinuities and other artifacts in the picture.

III. Signaling for Skip Frames with Repeat Padding

Described embodiments include techniques and tools for signaling skip frames. Skip frames are frames that are coded as being identical in content to a reference frame. Such skip frames can then be encoded in the compressed video 395 (FIG. 3) by signaling that the frame is a skip frame, without further encoding the picture content of the frame. At decoding, the picture content of the skip frame is recovered by repeating the picture content of the reference frame.

The encoder 300 (FIG. 3) can apply this skip frame coding when it determines that successive frames of a video sequence are identical or substantially identical, e.g., due to a lack of motion in the scene. Skip frame coding can also be used for pull-down conversions. In video pull-down conversions (e.g., from 24-frame-per-second film to 30-frame-per-second or 60-frame-per-second video), the frame/field rate is artificially increased after decoding through repeated display of the same decoded frames or fields in a video sequence. Pull-down conversions are important for interoperability of NTSC video and film footage, which have different frame rates.

Further, the described embodiments include a way to efficient signal different types of skipped frames. In one example, progressive skip frame and interlaced skip frames can be signaled. This allows the repeat padding method of a skipped frame to be varied. The repeat padding of progressive pictures is done by repeating the edges of the active video boundary to fill out the expanded region. More specifically, the edge row of the active content is repeated to pad the picture vertically, while the edge column of the active content is repeated to pad the picture horizontally. Repeat padding of interlaced content pictures, on the other hand, is accomplished by repeating the last two edges rows of the active video (i.e., the last row of each interlaced field) to pad the picture vertically, whereas the edge column is repeated to pad horizontally. This repeat padding using the active video boundary has the benefit of serving as better prediction area for the following frames. For a subsequent predictively coded frame, a macroblock's motion vector can point to the expanded region. This typically provides a better prediction of the macroblock in the predicted frame, often resulting in a zero or minimal block error signal that can be more efficiently encoded. The encoder thus can effectively "zero"-out the information that otherwise has to be transmitted for the expanded region.

The skip frame signaling in one described embodiment of the video codec signals the frame is a skip frame using frame level syntax elements. For coding economy, skip frame signaling is jointly signaled along with other frame header level information. In one implementation, variable length codes of a syntax element for the frame coding type (e.g., I-, P- or B-frame) includes an escape sequence to signal the frame is a skipped frame. Further, a frame coding mode syntax element distinguishes between the types of skipped frames, whether progressive or interlaced. This determines the repeat padding applied to the frame.

The syntax elements described herein are only examples; other syntax elements can be used in accordance with the described techniques. Furthermore, the syntax elements can be of different sizes or structures and can be used in different syntax layers in accordance with the described techniques and tools.

The described techniques and tools can be used in combination with one another or with other techniques and tools, or can be used independently.

A. Pull-down Signaling

To facilitate pull-down for interlaced or progressive content, an encoder sends one or more repeat-picture (e.g., repeat-frame or repeat-field) elements to indicate which pictures (e.g., frames or fields), if any, are to be repeated during display (e.g., to increase playback frame/field rate) Accordingly, in one implementation, an encoder sends a syntax element (e.g., in a sequence layer in a bitstream having plural layers) to indicate whether repeat-picture elements are present in the bitstream. For example, an encoder sends a 1-bit syntax element (PULLDOWN) to indicate whether one or more repeat-picture elements are present in the bitstream for either progressive or interlaced content. A decoder performs corresponding decoding.

FIG. 7 shows a technique 700 for decoding frame data where the presence or absence of repeat-picture elements is signaled in a bitstream. At 710, a decoder processes a bitstream element (e.g., PULLDOWN) at a layer above frame layer (e.g., sequence layer). The bitstream element indicates the presence or absence of one or more repeat-picture elements (e.g., RFF, RPTFRM, or other repeat-picture elements) at frame layer in the bitstream. At 720, the decoder processes the frame layer data, such as by decoding repeat-picture elements that may be present in the bitstream.

In one implementation, an encoder/decoder uses the PULLDOWN element for progressive or interlaced content. The specific repeat-picture elements signaled by the PULLDOWN element will depend on whether the content is progressive or interlaced. For example, in one implementation, the INTERLACE flag is a sequence layer element that indicates whether the content of the video is interlaced or progressive. If INTERLACE=1, the content is interlaced; if INTERLACE=0, the content is progressive.

For interlaced content, PULLDOWN indicates whether the repeat-picture syntax element Repeat First Field (RFF) is present in the bitstream. PULLDOWN also indicates whether the field-ordering element Top Field First (TFF) is present in the bitstream.

In one implementation, when a sequence has an interlaced target display type (INTERLACE=1) and pull-down is used (PULLDOWN=1), picture headers contain the one-bit repeat-picture element RFF. The time allotted for displaying a single field without repeating the field is called a field period. Thus, two field periods are required to display each field once in a frame having two fields. When the RFF flag is set for a frame, the display process displays the first field of a field pair a second time after displaying the second field of the pair—thus extending the duration of the display of the frame having the field pair to three field display periods.

The order in which the two fields of a frame are displayed on the target display is determined by the TFF flag in the picture header. For example, if TFF=1, the decoded field spatially closer to the top of the display (i.e., the top field) is displayed for one display field period, followed by the decoded field spatially closer to the bottom of the display. If TFF=0, the decoded field spatially closer to the bottom of the display (i.e., the bottom field) is displayed for one display field period, followed by the top field.

When a decoded frame is displayed for three display field periods, the subsequent decoded frame is flagged with the opposite value of TFF (i.e. if the first decoded frame has TFF=1, the second decoded frame has TFF=0). This ensures that a top field always follows a bottom field, and vice versa, in display order, regardless of whether the first field is repeated.

In this implementation, if PULLDOWN=0, decoded pictures are displayed as if TFF=1, but TFF is not explicitly sent in the bitstream. In other words, the top field is first by default.

For progressive content, PULLDOWN indicates whether the repeat-picture syntax element RPTFRM is present in the bitstream. In one implementation, RPTFRM is a two-bit element indicating how many times (from zero to three) a progressive frame is to be repeated during display. For example, if a compressed 24-fps bitstream is targeted for a 60-fps progressive display, the value of RPTFRM alternates between 1 and 2 in successive frames, and the display process may then display decoded frames for 2 or 3 display frame periods, respectively.

Alternatively, repeat-picture elements and field-order elements indicate different information, such as different numbers of picture display repetitions (e.g., for different conversion ratios), or different display ordering.

As another alternative, an encoder sends an entry point layer syntax element to indicate whether repeat-picture elements and/or field-order elements are present. In general, an entry point marks a position in a bitstream (e.g., an I-frame or other key frame) at which a decoder can begin decoding. In other words, no pictures before the entry point in the bitstream are needed to decode pictures after the entry point that are within an entry point segment. An encoder can use an entry point header element to signal whether repeat-picture elements and/or field-order elements are present within an entry point segment.

Field-order elements do not affect the decoding process, and therefore can be ignored by a decoder.

B. Pan/Scan Windows

A pan/scan region is a sub-region of the display region which can be used as an alternative presentation format. The most common application is to display a 4:3 sub-region of 16:9 content. A pan/scan window is a portion of video displayed on a screen as a result of a view selection.

In one embodiment, the INTERLACE, PULLDOWN, RFF and RPTFRM bitstream elements determine a number of pan/scan windows present for each displayed field or frame. The relationship of these bitstream elements to pan/scan windows is described in further detail in Section IV, below.

Like display-ordering elements, pan-scan information does not affect the decoding process, and can be ignored by a decoder.

IV. Combined Implementations

A detailed combined implementation for a bitstream syntax, semantics, and decoder are now described, in addition to an alternative combined implementation with minor differences from the main combined implementation.

A. Bitstream Syntax

In various combined implementations, data is presented in the form of a bitstream having plural layers (e.g., sequence, entry point, frame, field, macroblock, block and/or sub-block layers).

The compressed video bit stream can contain one or more entry points. As discussed more fully in Holcomb et al., "Signaling Valid Entry Points In A Video Stream," U.S. patent application Ser. No. 10/882,739, filed Jun. 30, 2004 [hereafter the "Entry-Point Patent Application"], and claiming priority to U.S. Provisional Patent Application No. 60/520,543, filed Nov. 13, 2003, the disclosures of which are hereby incorporated herein by reference, valid entry points in a bitstream are locations in an elementary bitstream from which a system (e.g., a receiver, a video splicer, a commercial insertion tool, a video editor, a summarization engine, etc.) can decode or process the bitstream without the need of any preceding information (bits) in the bitstream. Frames that can be decoded without reference to preceding frames are typically referred to as "key" frames.

An entry point is signaled in a bitstream by an entry point indicator. The purpose of an entry point indicator is to signal the presence of a special location in a bitstream to begin or resume decoding (e.g., where there is no dependency on past decoded video fields or frames to decode the video frame following immediately the entry point indicator). Entry point indicators can be inserted at regular or irregular intervals in a bitstream. Therefore, an encoder can adopt different policies to govern the insertion of entry point indicators in a bitstream.

The video codec supports various compression profiles, including a simple, main and advanced profile. The advanced profile of the video codec syntax supports encoding mixed interlaced and progressive content (i.e., hybrid) video sequences.

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Figure 8:
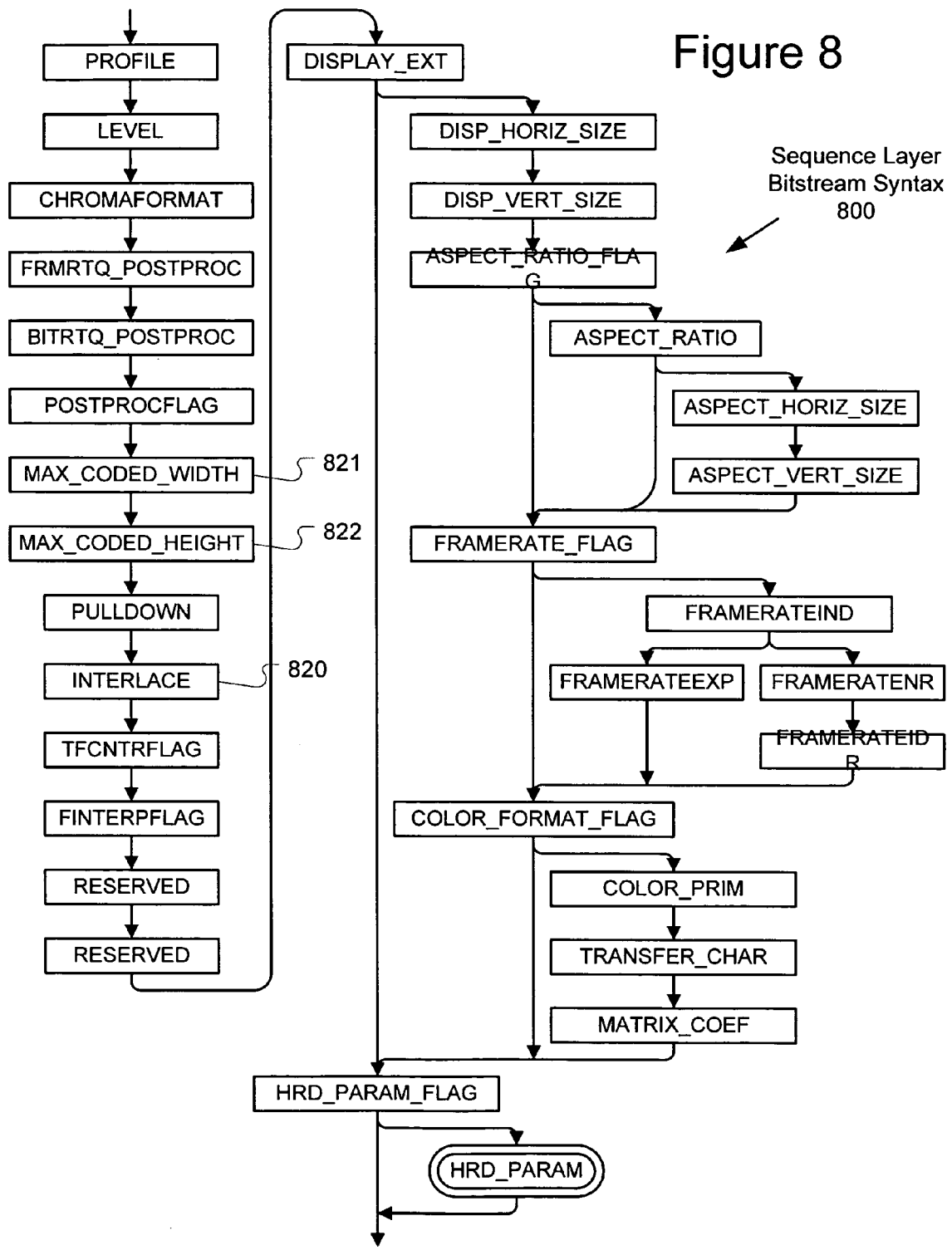
FIG. 8 is a diagram showing a sequence-layer bitstream syntax in a combined implementation.

Sequence-level bitstream elements are shown in FIG. 8. Sequence-level elements are used to decode a sequence of compressed video frames. Sequence-level data can affect the interpretation or presence of elements at other levels (e.g., entry point level, frame level, macroblock level, etc.) In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools for frames following an entry point).

Figure 9:
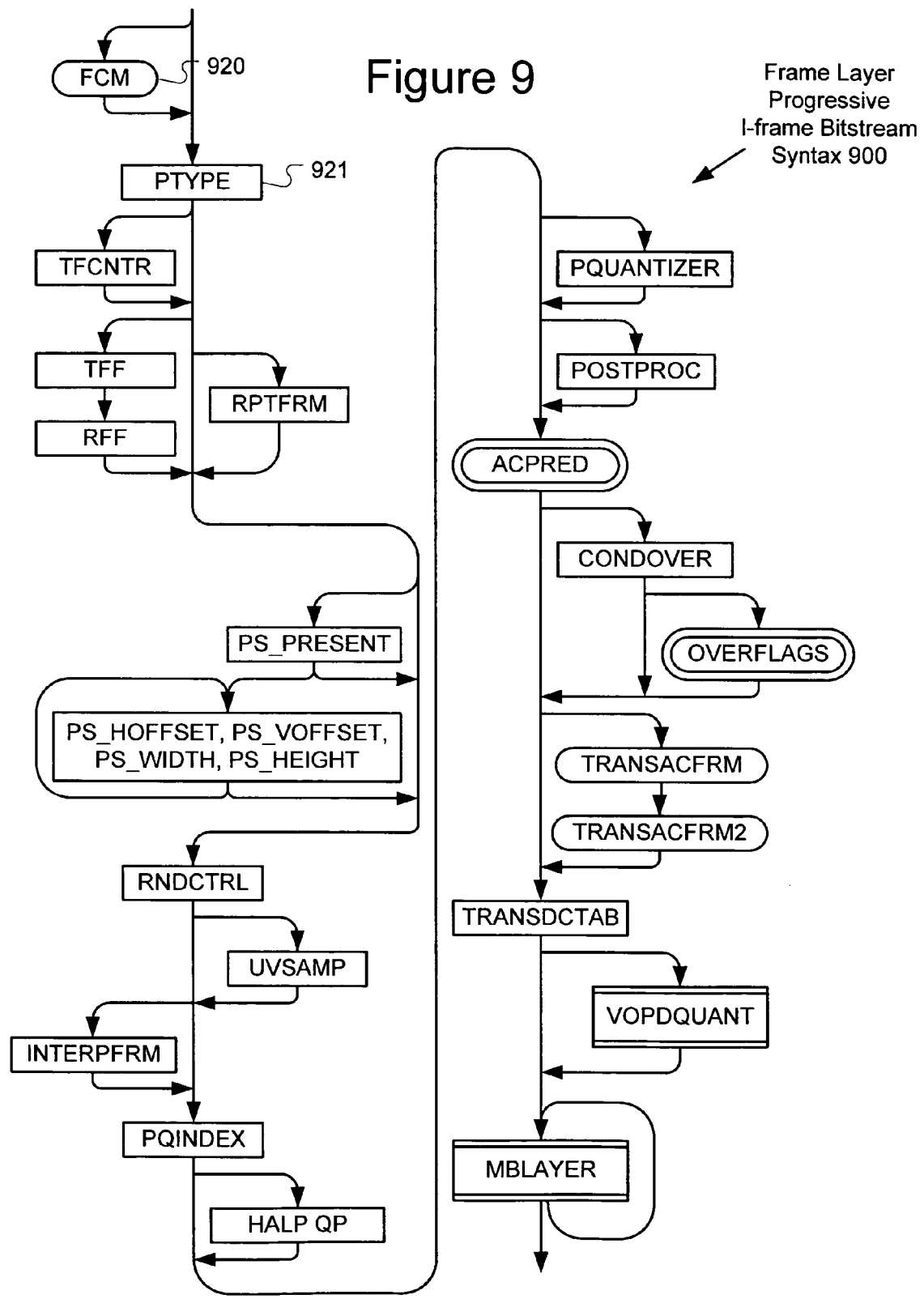
FIG. 9 is a diagram showing a frame-layer bitstream syntax for progressive I-frames in a combined implementation.
Figure 10:
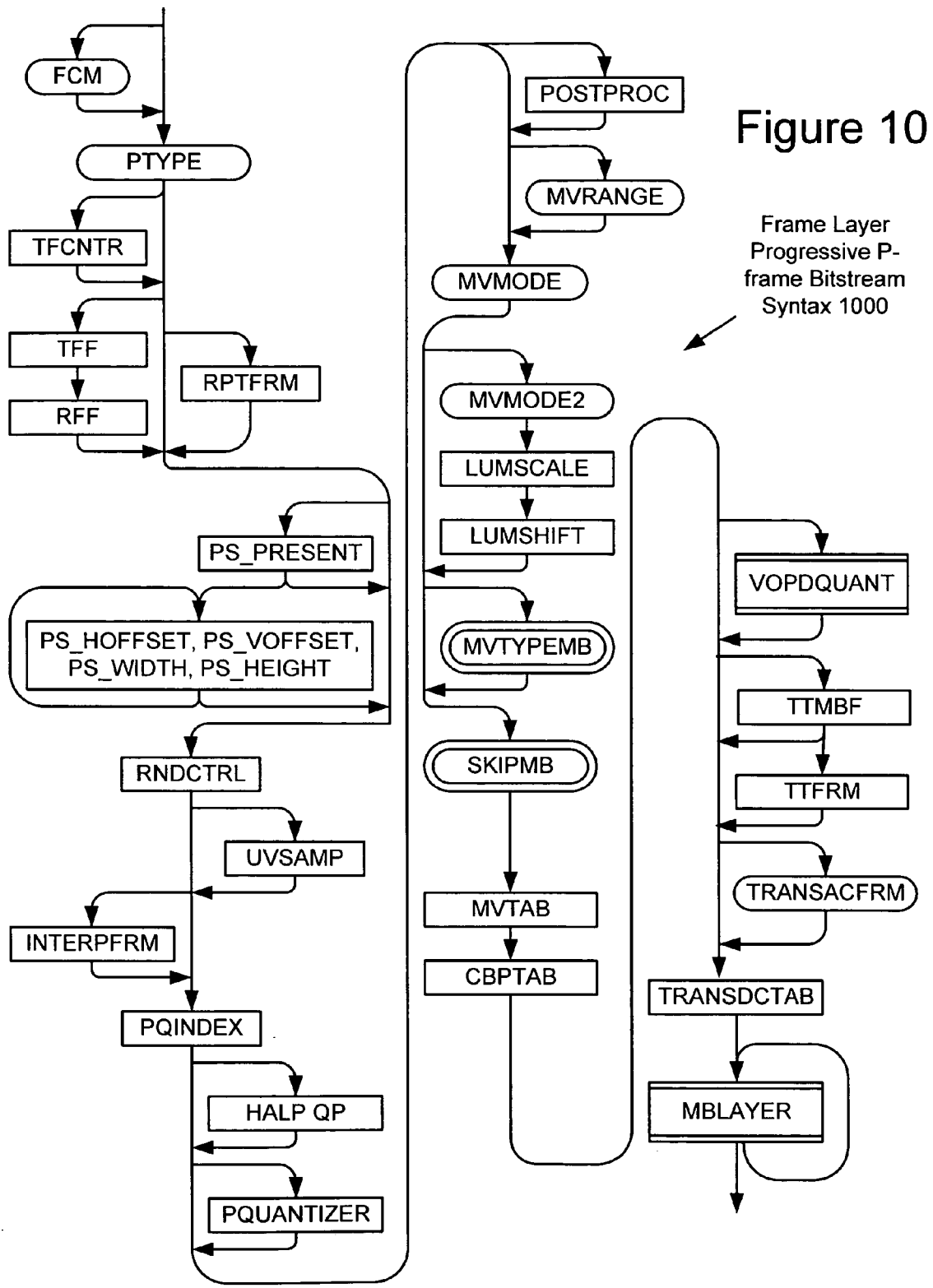
FIG. 10 is a diagram showing a frame-layer bitstream syntax for progressive P-frames in a combined implementation.
Figure 11:
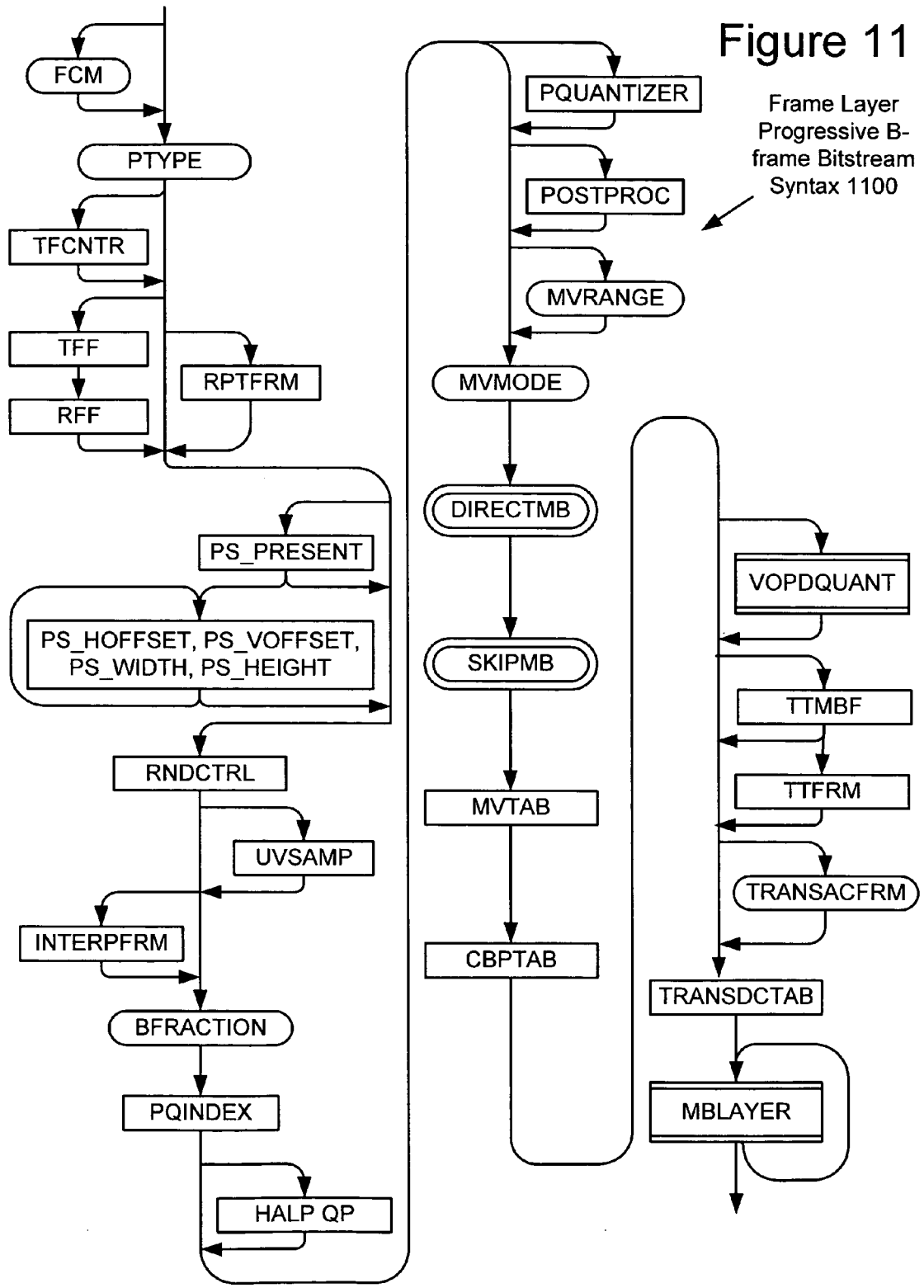
FIG. 11 is a diagram showing a frame-layer bitstream syntax for progressive B-frames in a combined implementation.

For progressive I-frames, P-frames, and B-frames, frame-level bitstream elements are shown in FIGS. 9, 10, and 11, respectively. (Frame-level bitstream elements for progressive BI-frames are identical to those for progressive I-frames.) Data for each frame consists of a frame header followed by data for the macroblock layer (whether for intra or various inter type macroblocks).

Figure 12:
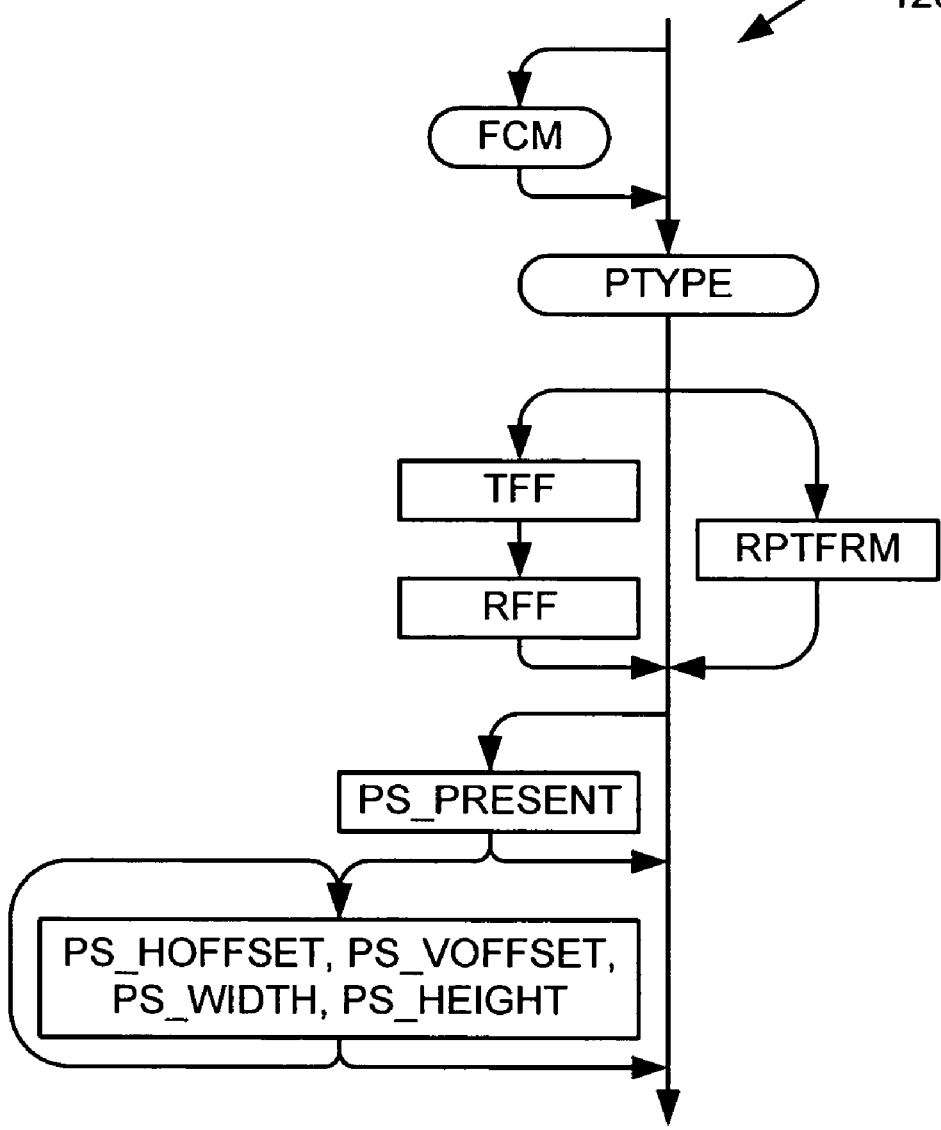
FIG. 12 is a diagram showing a frame-layer bitstream syntax for skipped frames in a combined implementation.

For progressive skipped frames, frame-level bitstream elements are shown in FIG. 12. (Frame-level bitstream elements for interlaced skipped frames are identical to those for progressive skipped frames.)

Figure 13:
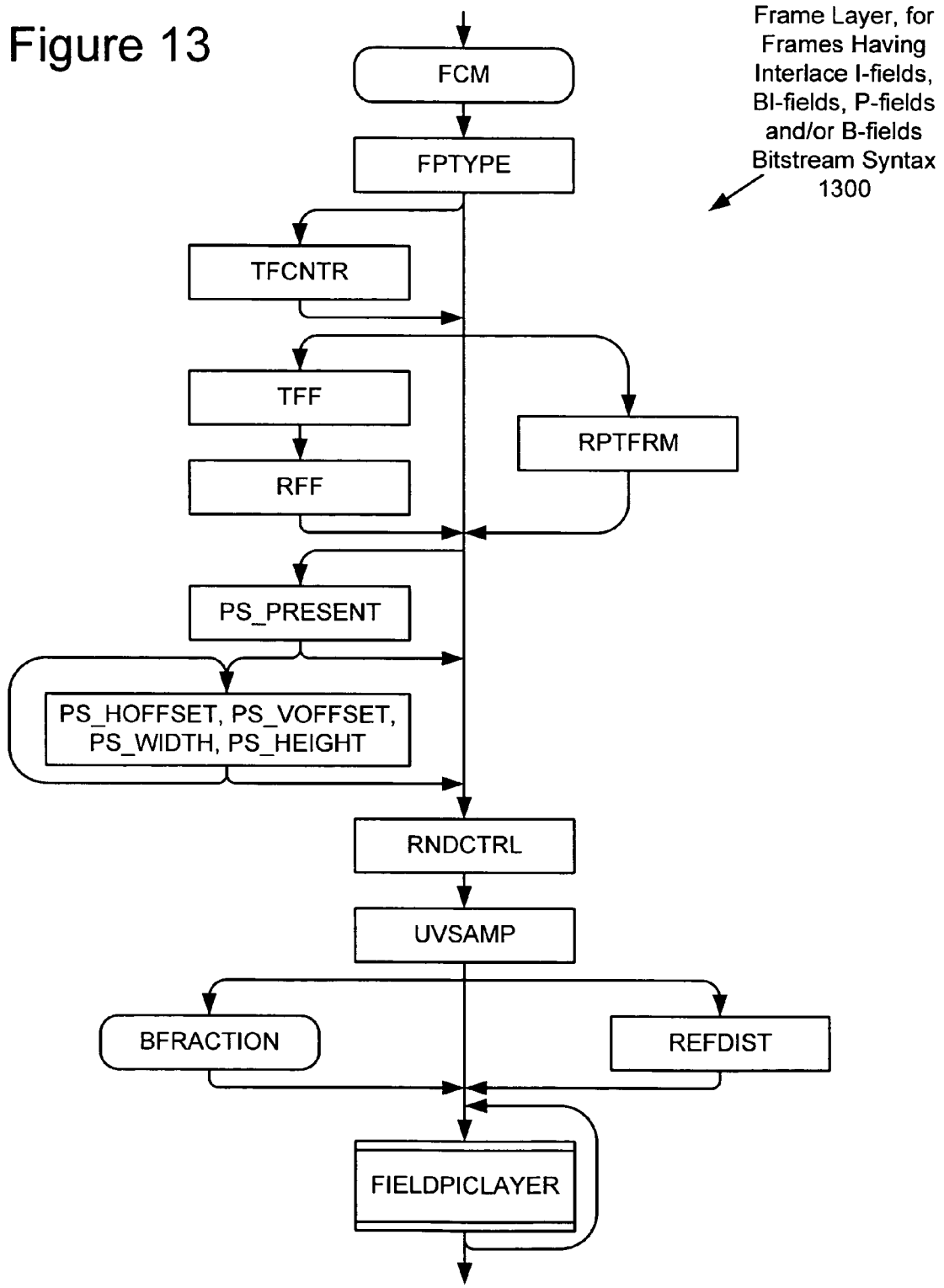
FIG. 13 is a diagram showing a frame-layer bitstream syntax for interlaced I-fields, BI-fields, P-fields or B-fields in a combined implementation.

For interlaced video frames with interlaced I-fields, P-fields, B-fields and/or BI-fields, frame-level bitstream elements are shown in FIG. 13. Data for each frame consists of a frame header followed by data for the field layers (shown as the repeated "FieldPicLayer" element per field) and data for the macroblock layers (whether for intra, 1 MV, or 4 MV macroblocks).

Figure 14:
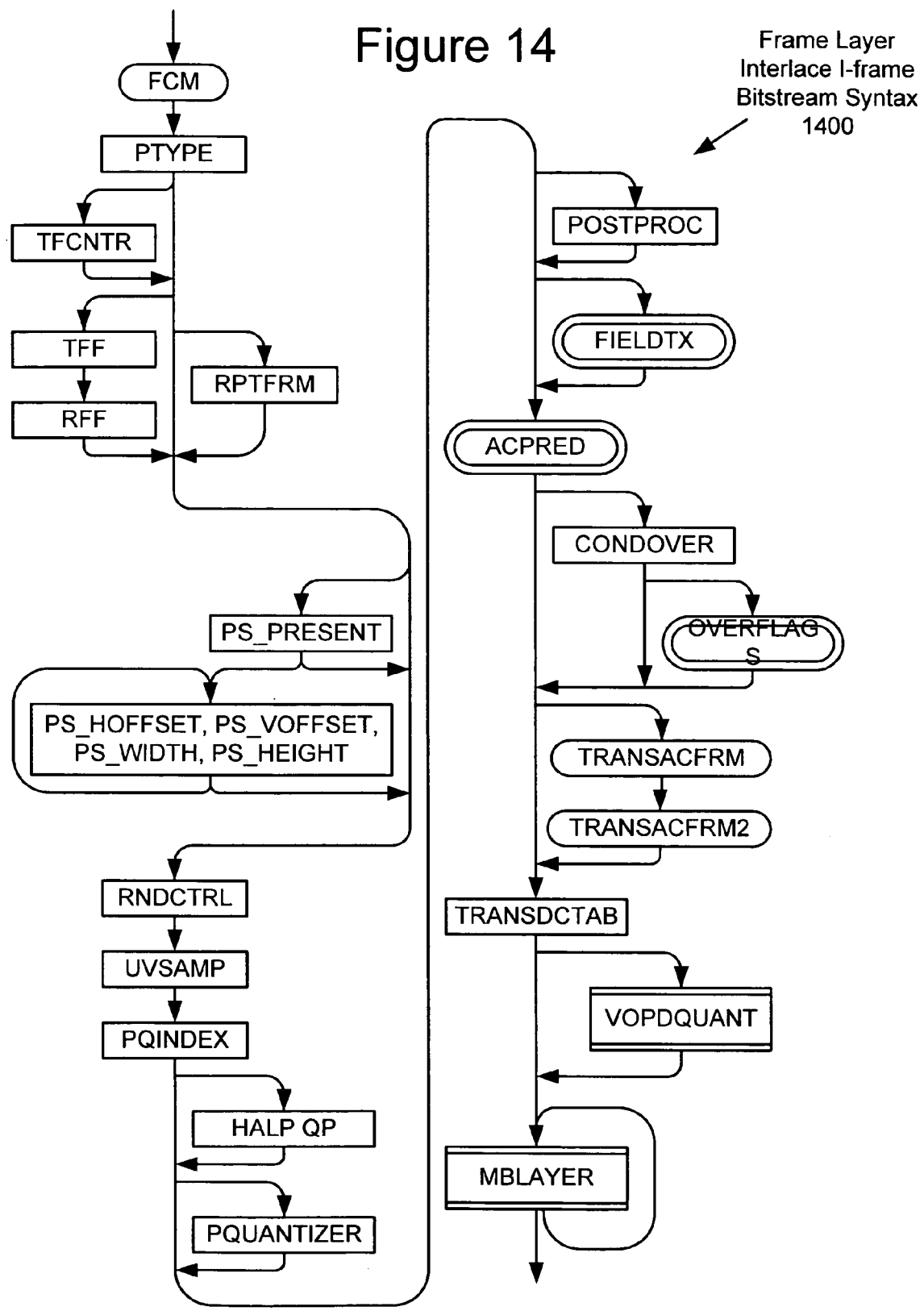
FIG. 14 is a diagram showing a frame-layer bitstream syntax for interlaced I-frames in a combined implementation.
Figure 15:
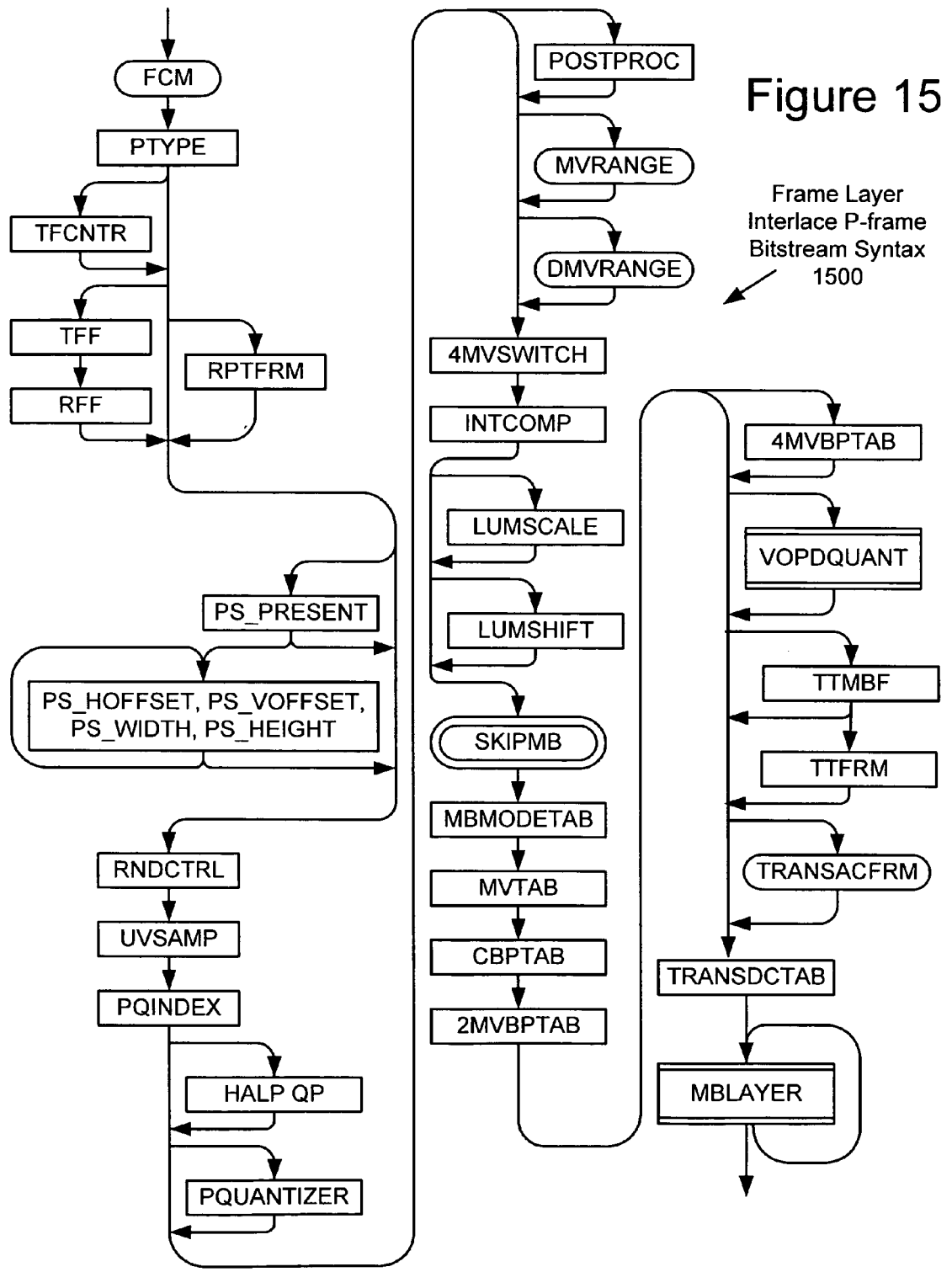
FIG. 15 is a diagram showing a frame-layer bitstream syntax for interlaced P-frames in a combined implementation.
Figure 16:
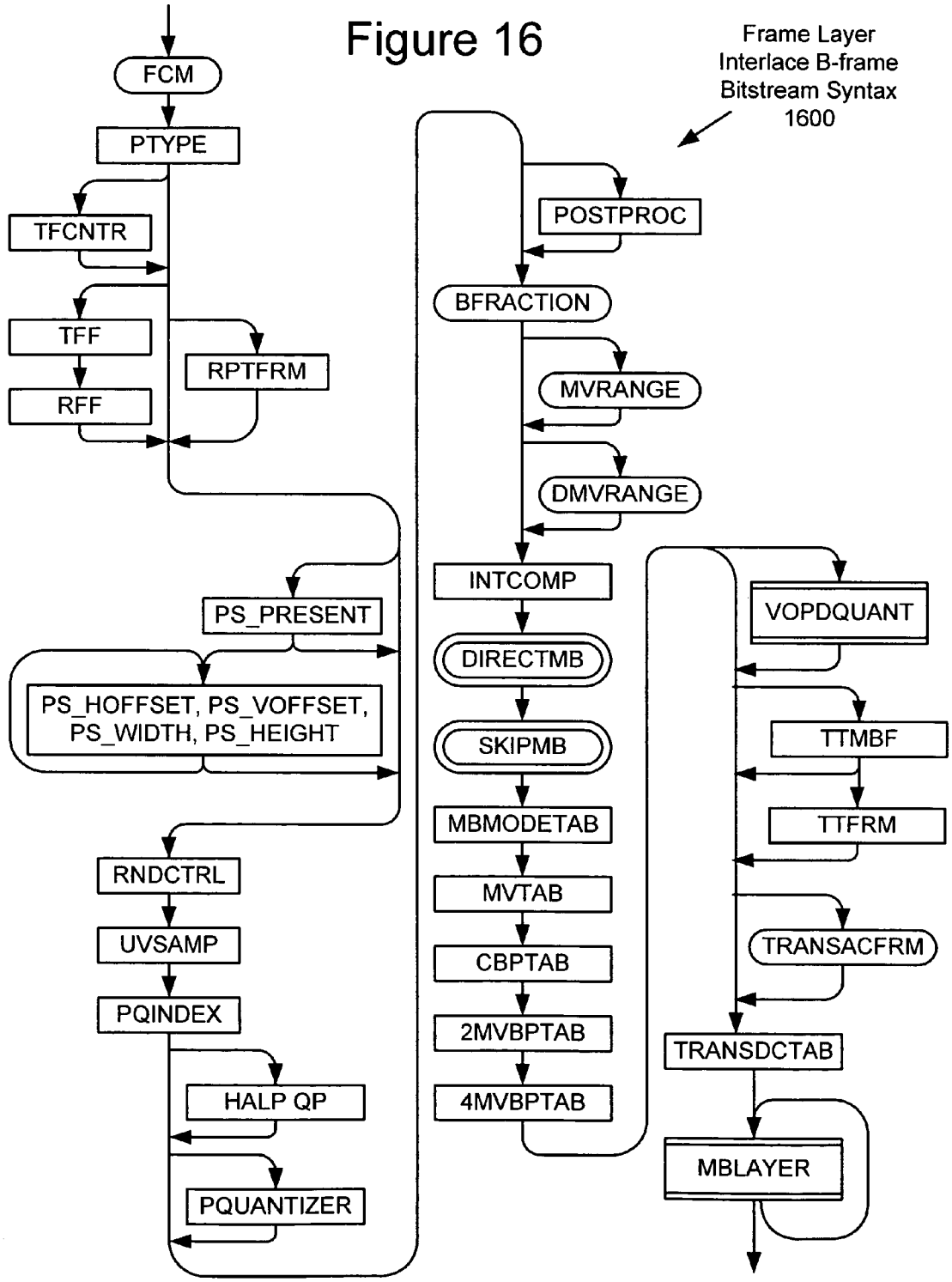
FIG. 16 is a diagram showing a frame-layer bitstream syntax for interlaced B-frames in a combined implementation.

For interlaced I-frames, P-frames, and B-frames, frame-level bitstream elements are shown in FIGS. 14, 15, and 16, respectively. (Frame-level bitstream elements for interlaced BI-frames are identical to those for interlaced I-frames.) Data for each frame consists of a frame header followed by data for the macroblock layer (whether for intra or various inter type macroblocks).

The following sections describe selected bitstream elements in the sequence, entry point and frame layers that are related to skip frame signaling and skip frame repeat padding for interlaced and progressive pictures. Although the selected bitstream elements are described in the context of a particular layer, some bitstream elements can be used in more than one layer.

1. Selected Sequence Layer Elements

FIG. 8 is a diagram showing a sequence-layer bitstream syntax for progressive and/or interlaced video. Specific bitstream elements are described below.

Pull-down Flag (PULLDOWN) (1 Bit)

PULLDOWN is a 1-bit syntax element that indicates if the syntax elements RPTFRM, or TFF and RFF are present in frame headers. PULLDOWN, RPTFRM, TFF and RFF are discussed in further detail below and above in Section III.

Interlace Content (INTERLACE) (1 Bit)

INTERLACE 820 is a 1-bit syntax element. INTERLACE=0 signals that the source content is progressive. INTERLACE=1 signals that the source content is interlaced. The individual frames may still be coded using the progressive or interlace syntax when INTERLACE=1. If PULLDOWN=1, the INTERLACE syntax element specifies if it is TFF and RFF, or RPTFRM that is present in the picture headers. INTERLACE is discussed in further detail below and above in Section III.

Max Coded Width (MAX_CODED_WIDTH) (12 Bits)

The MAX_CODED_WIDTH element 821 specifies the maximum horizontal size of the coded picture within the sequence. In the illustrated implementation, this syntax element is a 12-bit binary encoding of sizes. The maximum horizontal size of the picture is equal to the value of this field multiplied by 2, plus 2. The horizontal size of the coded pictures in the video sequence may change at an entry point but is always less than, or equal to, MAX_CODED_WIDTH. Alternative implementations can utilize a maximum coded width syntax element having a different size and/or specifying the maximum horizontal size in a different way.

Max Coded Height (MAX_CODED_HEIGHT) (12 Bits)

The MAX_CODED_HEIGHT element 822 specifies the maximum vertical size of the coded picture within the video sequence. In the illustrated implementation, this syntax element is a 12-bit binary encoding of sizes. The maximum vertical size of the picture is equal to the value of this field multiplied by 2, plus 2. The vertical size of the coded pictures in the video sequence may change at an entry point but is always less than, or equal to, MAX_CODED_HEIGHT. Alternative implementations can utilize a maximum coded height syntax element having a different size and/or specifying the maximum vertical size in a different way.

2. Selected Frame Layer Elements

FIGS. 9, 10, and 11 are diagrams showing frame-level bitstream syntaxes for progressive I-frames, P-frames and B-frames, respectively. (Frame-level bitstream elements for progressive BI-frames are identical to those for progressive I-frames.) FIG. 12 is a diagram showing a frame-layer bitstream syntax for progressive skipped frames. (Frame-level bitstream elements for interlaced skipped frames are identical to those for progressive skipped frames.) FIG. 13 is a diagram showing a frame-layer bitstream syntax for frames containing interlaced I-fields, P-fields, B-fields and/or BI-fields (or potentially other kinds of interlaced fields). FIGS. 14, 15, and 16 are diagrams showing frame-level bitstream syntaxes for interlaced I-frames, P-frames and B-frames, respectively. (Frame-level bitstream elements for interlaced BI-frames are identical to those for interlaced I-frames.) Specific bitstream elements are described below.

Frame Coding Mode (FCM) (Variable Size)

FCM 920 is a variable length codeword ["VLC"] used to indicate the picture coding type. FCM takes on values for frame coding modes as shown in Table 1 below:

TABLE 1

Frame Coding Mode VLC

| FCM value | Frame Coding Mode |
| --- | --- |
| 0 | Progressive |
| 10 | Frame-Interlace |
| 11 | Field-Interlace |

Field Picture Type (FPTYPE) (3 Bits)

FPTYPE is a three-bit syntax element present in the frame header for a frame including interlaced P-fields, interlaced I-fields, interlaced B-fields, and/or interlaced BI-fields, and potentially other kinds of fields. FPTYPE takes on values for different combinations of field types in the interlaced video frame, according to Table 2 below.

TABLE 2

Field Picture Type FLC

| FPTYPE FLC | First Field Type | Second Field Type |
| --- | --- | --- |
| 000 | I | I |
| 001 | I | P |
| 010 | P | I |
| 011 | P | P |
| 100 | B | B |
| 101 | B | BI |
| 110 | BI | B |
| 111 | BI | BI |

In an alternative combined implementation, the picture type information is signaled at the beginning of the field level for a field, instead of at the frame level for the interlaced video frame including the field.

Picture Type (PTYPE) (Variable Size)

PTYPE 921 is a variable size syntax element present in the frame header for progressive and interlaced frames. PTYPE takes on values for different frame types according to Table 3 below.

TABLE 3

Picture Type VLC

| PTYPE VLC | Picture Type |
| --- | --- |
| 110 | I |
| 0 | P |
| 10 | B |

TABLE 3-continued

Picture Type VLC

| PTYPE VLC | Picture Type |
|---|---|
| 1110 | BI |
| 1111 | Skipped |

If PTYPE indicates that the frame is skipped then the frame is treated as a P-frame that is identical to its reference frame. The reconstruction of the skipped frame is equivalent conceptually to copying the reference frame. A skipped frame means that no further image data is transmitted for this frame, although additional data may be sent relating to display of the frame (e.g., TFF, RFF and/or RPTFRM fields).

Top Field First (TFF) (1 Bit)

TFF is a one-bit element that is present if the sequence header element PULLDOWN is set to '1' and the sequence header element INTERLACE=1. TFF=1 implies that the top field is the first decoded field. If TFF=0, the bottom field is the first decoded field. If PULLDOWN is set to '0', TFF is not present, and its value shall be assumed to be '1'. TFF is discussed in further detail below and above in Section III.

Repeat First Field (RFF) (1 Bit)

RFF is a one-bit element that is present if the sequence header element PULLDOWN is set to '1' and the sequence header element INTERLACE=1. RFF is not part of the decoding process, but it is used during display. RFF=1 implies that the first field should be repeated during display. RFF=0 implies that no repetition is necessary. RFF is discussed in further detail below and above in Section III.

Repeat Frame Count (RPTFRM) (2 Bits)

RPTFRM is a two-bit syntax element that is present if the sequence header element PULLDOWN is set to '1' and the sequence header element INTERLACE=0. RPTFRM takes a value from 0 to 3 which is coded in binary using 2 bits. RPTFRM is not part of the decoding process, but it is used during display. It represents the number of times a frame is repeated during display. RPTFRM is discussed in further detail below and above in Section III.

3. Selected Entry Point Layer Elements

Figure 17:
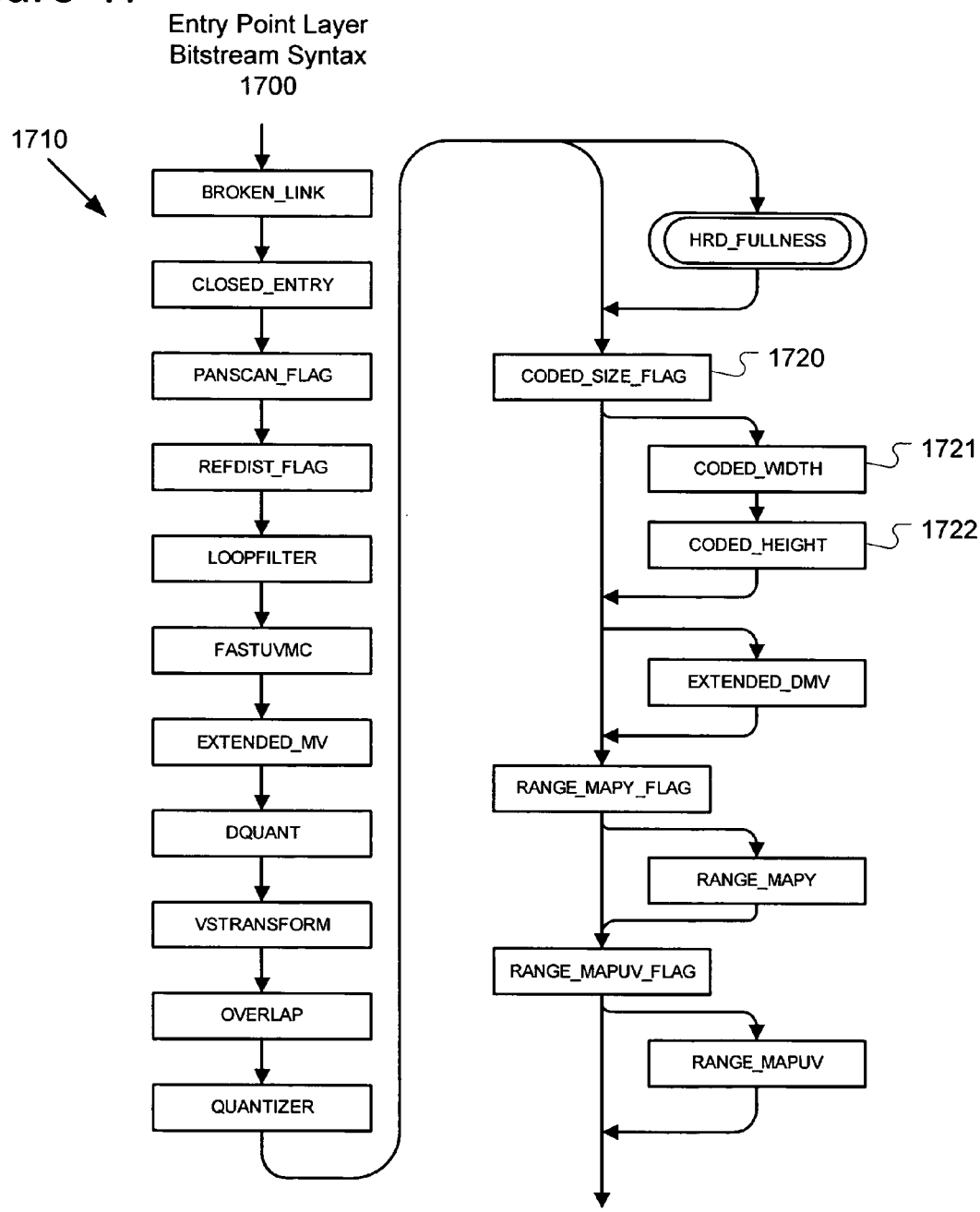
FIG. 17 is a diagram showing an entry point-layer bitstream syntax.

FIG. 17 is a syntax diagram for the entry point layer 1700. The entry point layer 1700 includes an entry point header 1710 followed by data for a group of pictures forming an entry point segment. The entry point header 1710 includes several entry point-level elements that are processed by the decoder and used to decode the following picture frames without reference to preceding picture data in the video sequence. The elements that make up the entry point header include a coded size flag (CODED_SIZE_FLAG) element 1720, a coded width (CODED_WIDTH) element 1721, and a coded height (CODED_HEIGHT) element 1722, among others.

The CODED_SIZE_FLAG signals a different coded resolution for pictures in the entry point segment. In the illustrated implementation, the CODED_SIZE_FLAG element 1720 is a 1-bit syntax element. A value of one (CODED_SIZE_FLAG=1) indicates that the CODED_WIDTH and CODED_HEIGHT syntax elements are also present in the entry header. Otherwise, a flag value of zero (CODED_SIZE_FLAG=0) indicates that the CODED_WIDTH and CODED_HEIGHT syntax elements are not present in the entry header; and the width and height of the frames within the entry point segment are specified by the MAX_CODED_WIDTH and MAX_CODED_HEIGHT syntax elements in the sequence header. Alternative implementations can utilize a different format flag or value to signal a group of pictures in the video sequence has a different coded size.

The CODED_WIDTH element 1721 specifies the coded horizontal size of pictures in the entry point segment. In the illustrated implementation, the CODED_WIDTH element 1721 is a 12 bit syntax element that is present if CODED_SIZE_FLAG=1. It specifies the coded width of the frames within the entry point segment in units of 2 pixels. The coded width of the frames within the entry point segment is equal to the value of this field multiplied by 2, plus 2. Therefore, the range is 2 to 8192. Alternative implementations can use a different syntax element format to signal the coded horizontal picture size.

Similarly, the CODED_HEIGHT element 1722 specifies the coded vertical size of pictures in the entry point segment. The CODED_HEIGHT element is a 12 bit syntax element that is present if CODED_SIZE_FLAG=1. It specifies the coded height of the frames within the entry point segment in units of 2 pixels. The coded height of the frames within the entry point segment is equal to the value of this field multiplied by 2, plus 2. Therefore, the range is 2 to 8192. Alternative implementations can use a different syntax element format to signal the coded vertical picture size.

B. Display Metadata

This combined implementation includes a number of fields which provide information useful to the post-decode display process. This information is output by the decoder and may be used by the display process to adapt the decoded pictures to a format appropriate for the output of the display process.

1. Frame Rate

In this combined implementation frame rate fields (e.g., FRAMERATEIND, FRAMERATEEX, FRAMERATENR, FRAMERATEDR) represent the target display frame rate for the compressed stream. In the case of content with an interlaced target display (INTERLACE=1 in the sequence header), the frame rate is one-half the field rate of the target display.

The frame rate represents the output of the display process, and not necessarily the output of the decoding process (i.e., coded pictures in the compressed stream can occur less frequently than the target display frame rate).

Repeating Progressive Frames

For content with a progressive target display type (INTERLACE=0), when pull-down is used (PULLDOWN=1), picture headers contain the integer field RPTFRM. RPTFRM represents the number of times the decoded frame may be repeated by the display process. For example, if a compressed bit stream with 24 frames per second is targeted for a 60-frame-per-second progressive display (INTERLACE=0, FRAMERATEEX=0×0780), RPTFRM alternates between 1 and 2 in successive frames, and the display process may then display decoded frames for 2 or 3 display frame periods, respectively.

Field Order

When PULLDOWN is signaled in the sequence header, the order in which to display the two fields of a frame on the target display is determined by the TFF flag in the picture header. If TFF=1, the decoded field spatially closer to the top of the display (i.e., the top field) is displayed for one display field period, followed by the decoded field spatially closer to the bottom of the display. If TFF=0, the decoded field spatially closer to the bottom of the display (i.e., the bottom field) is displayed for one display field period, followed by the decoded field spatially located closer to the top of the display.

If PULLDOWN is not signaled in the sequence header, decoded pictures are displayed as if TFF=1, but TFF is not explicitly sent in the bitstream.

Repeating Fields

When a sequence has an interlaced target display type (INTERLACE=1) and pull-down is used (PULLDOWN=1), picture headers contain the Boolean field RFF. When the RFF flag is set, the display process may display the first field of a field pair again after displaying the second field of the pair—thus extending the duration of the field-pair (frame) to three display field periods.

When a decoded frame is displayed for three display field periods, the subsequent decoded frame will be flagged with the opposite value of TFF (i.e. if the first decoded frame has TFF=1, the second decoded frame has TFF=0).

2. Pan/Scan Regions

The Pan/Scan region is a sub-region of the display region which can be used as an alternative presentation format. The most common application is to display a 4:3 sub-region of 16:9 content.

The Boolean PANSCAN_FLAG, when set, signals that Pan/Scan windows are present for pictures within an entry point segment. Pan/Scan information is not necessarily available throughout an entire sequence.

Pan/Scan regions are described with respect to the display region, not the coded picture size. Thus the geometric relationship between a display and the Pan/Scan information is not affected by changes in the coded picture size.

Pan/Scan Windows

A Pan/Scan window is a portion of video displayed on a screen as a result of a view selection. Pan/Scan window information is present in picture headers if the entry point header syntax element PANSCAN_FLAG is 1. In this case, each picture header in the entry point segment has the PS_PRESENT syntax element. If PS_PRESENT is 1 then for each window in the frame there are four syntax elements—PS_HOFFSET, PS_VOFFSET, PS_WIDTH and PS_HEIGHT—that define the size and location of the window within the frame.

If PS_PRESENT is 1 then there are from one to four Pan/Scan windows in each frame. The number of Pan/Scan windows is determined by the sequence header syntax elements INTERLACE and PULLDOWN and the frame header syntax elements RFF and RPTFRM. The pseudo-code 1800 in FIG. 18 illustrates how the number of Pan/Scan windows is determined.

If the sequence header INTERLACE is 1 then there is a Pan/Scan window (if they are present) for each displayed field in the frame. Therefore, there are either two (for the case where RFF=0) or three (for the case where RFF=1) windows. If the sequence header INTERLACE is 0, there is a Pan/Scan window (if they are present) for each displayed frame. Since RPTFRM indicates how many times the current frame is repeated for display, the number of Pan/Scan windows is 1+RPTFRM.

For each Pan/Scan window there is a set of four Pan/Scan window syntax elements in the frame header: PS_HOFFSET, PS_VOFFSET, PS_WIDTH and PS_HEIGHT. The order of the pan windows in the frame header bitstream is the same as the display order of the fields or frames—meaning that the first set of Pan/Scan window syntax elements corresponds to the first field or frame in display order.

IV. Adaptive Vertical Macroblock Alignment

Figure 21A:
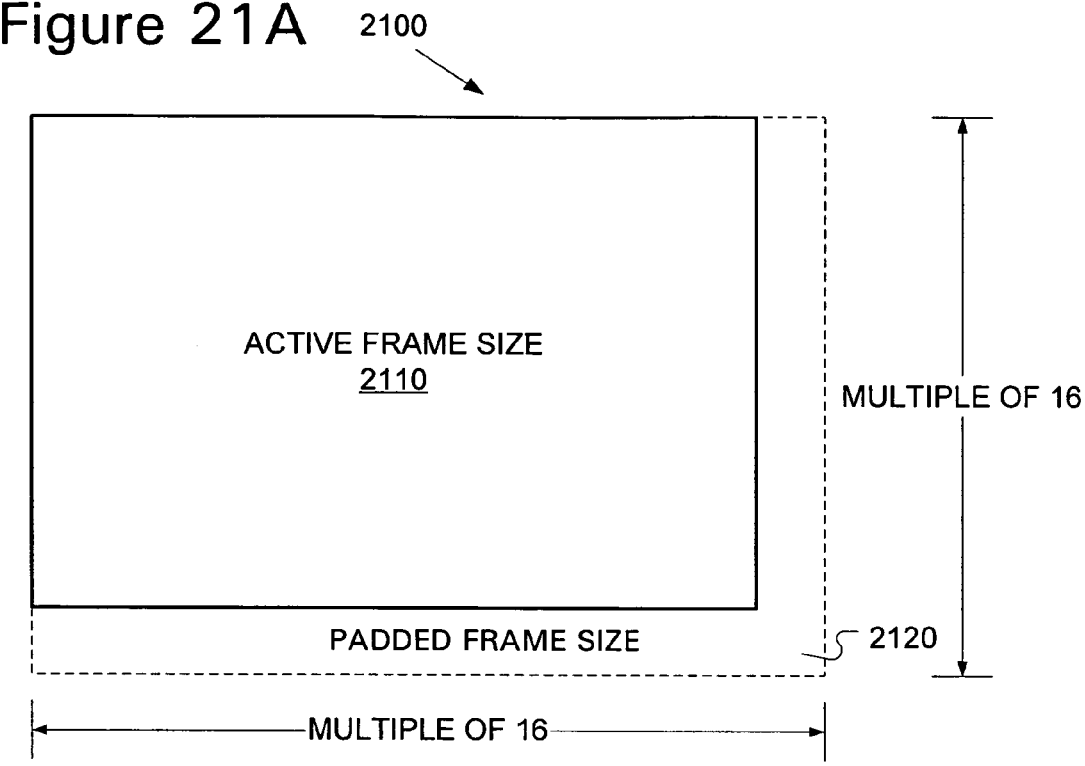
FIGS. 21A-B are diagrams of applying repeat padding and adaptive vertical macroblock alignment to progressive and interlaced pictures of a hybrid video sequence.
Figure 21B:
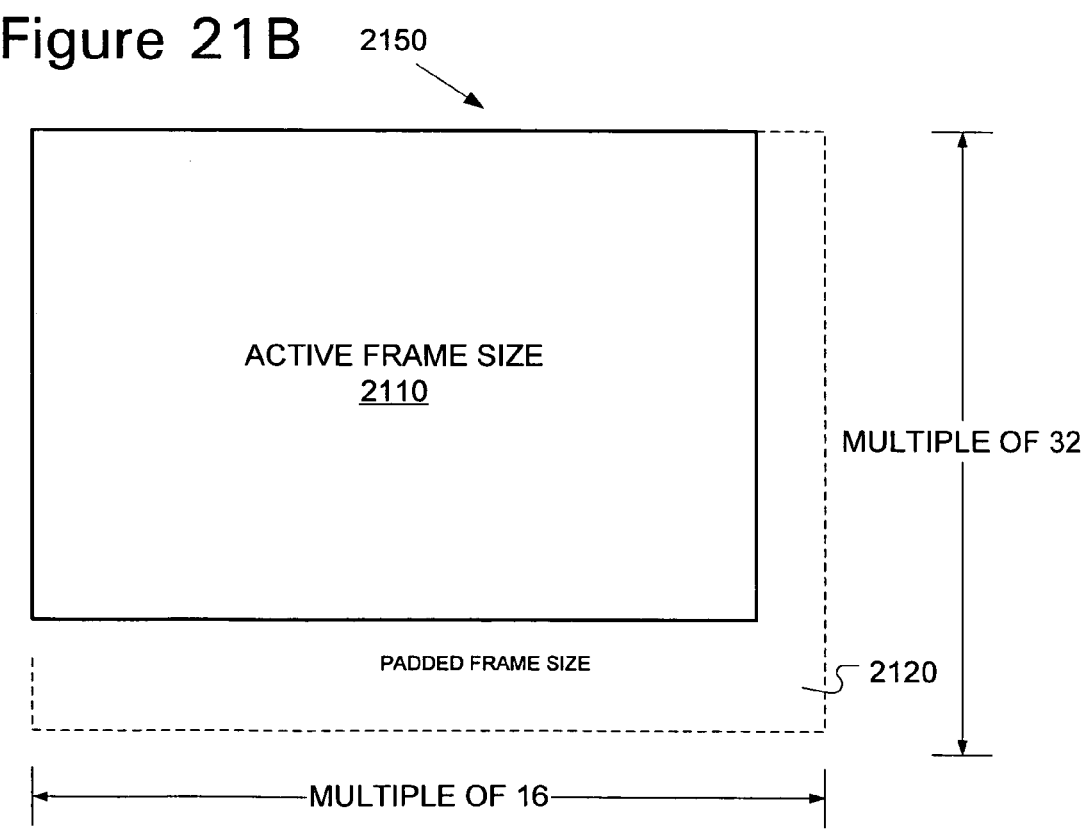

The video encoder 300 (FIG. 3) and decoder 400 (FIG. 4) provide for adaptive vertical macroblock alignment of mixed mode (or hybrid) video sequences, by enforcing vertical macroblock alignment restrictions on a per frame basis rather than imposing a uniform vertical macroblock alignment restriction across the entire video sequence. FIGS. 21A-B illustrate the different macroblock alignment restrictions for progressive and interlace content pictures. For pictures 2100 (FIG. 21A) in the video sequence coded in progressive mode, the video codec enforces a vertical macroblock alignment restriction of a multiple of 16 pixels. For interlaced field and interlaced frame mode pictures 2150 (FIG. 21B), the video codec enforces a height restriction to a multiple of 32 pixels. The horizontal alignment requirement is a multiple of 16 pixels. In alternative video codec implementations the height restriction for these modes can vary, such as due to use of a different macroblock size.

In a mixed frame (or hybrid) coding sequence, each frame can be encoded as one of progressive, interlaced frame or interlaced field types. By enforcing the height alignment restriction on a frame level, the video codec can achieve significant savings on padding operations relative to a design which requires all frames in a sequence to have the same height. This is because the video codec potentially can avoid padding progressive and interlace frame type pictures to the larger alignment requirement of interlaced pictures, reducing the padding required for such frames.

Figure 19:
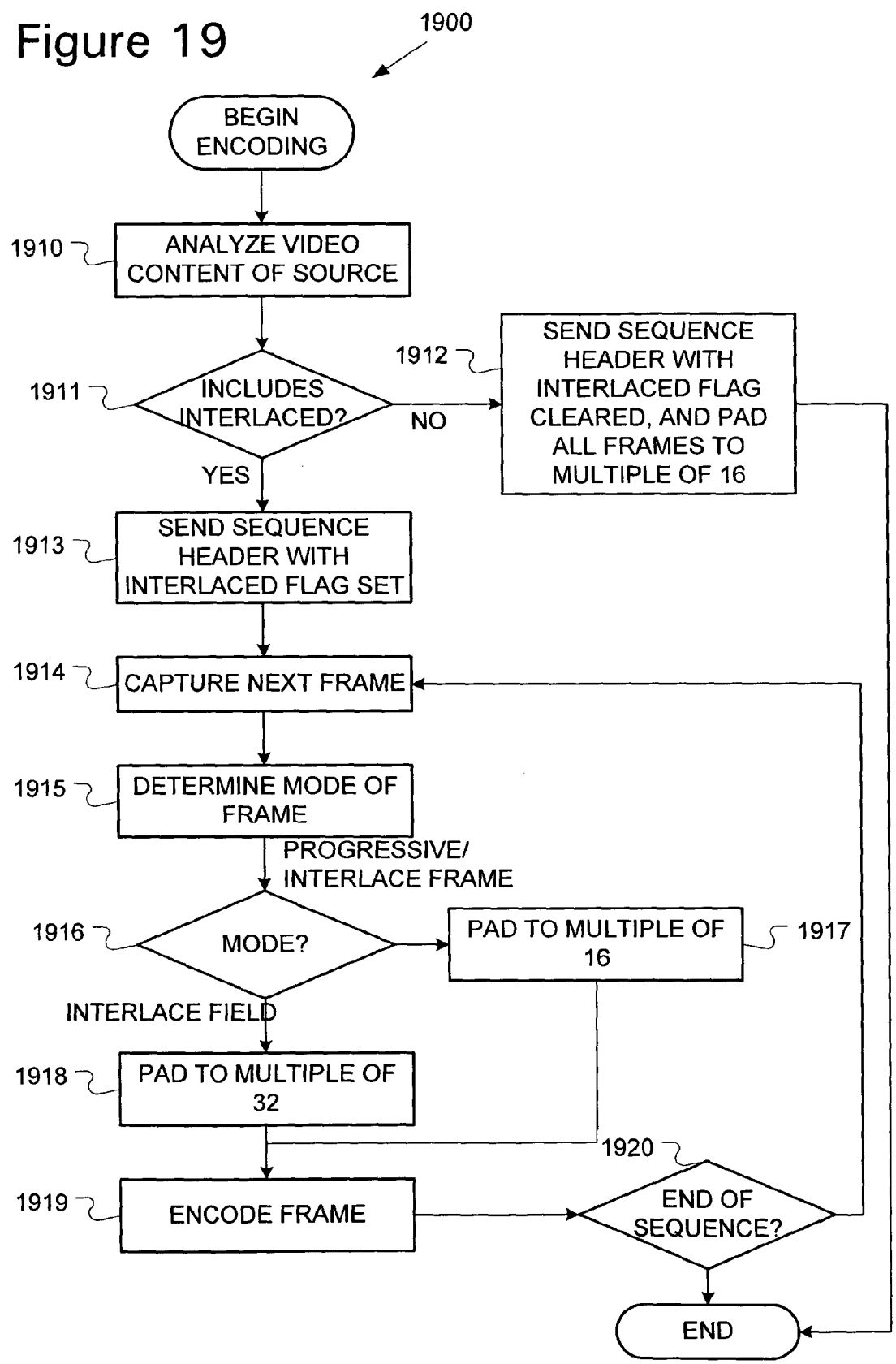
FIG. 19 is a flow diagram of a method utilized in the encoder of FIG. 3 for encoding a hybrid video sequence using adaptive vertical macroblock alignment.

With reference now to FIG. 19, the video encoder 300 (FIG. 3) performs operations for an adaptive vertical macroblock alignment encoding process 1900 when encoding a mixed video sequence. The diagram is simplified to illustrate the encoding operations relating to adaptive vertical macroblock alignment. It should be apparent to those skilled in the art that the encoding of the video sequence involves many more operations (not otherwise related to adaptive vertical macroblock alignment) as summarized above in the description of the encoder 300 in FIG. 3. Alternative implementations of the video encoder can perform the adaptive vertical macroblock alignment using fewer, more or a different arrangement of operations.

The video encoder begins this process by analyzing the video content of the sequence to determine whether any frames of the sequence have interlaced content at operation 1910. If all frame have progressive content at operations 1911-1912, the video encoder sends the sequence header for the sequence with the INTERLACE flag element 820 (FIG. 8) cleared. The video encoder then pads all pictures of the sequence to have a vertical macroblock alignment that is a multiple of 16 pixels. If any frames have interlaced content, the video encoder sends the sequence header with the interlaced content flag set, which indicates at least one frame is encoded as an interlaced field or interlaced frame type at operation 1913.

The video encoder then acquires the next picture of the video sequence from the video source at operation 1914, and determines the coding mode of the frame (whether progressive, interlaced frame or interlaced field) at operation 1915. Based on the mode, the video encoder enforces the appropriate vertical macroblock alignment restriction by padding (as necessary) to a multiple of 16 pixels for progressive and interlaced frame type pictures at operation 1917, or padding (as necessary) to a multiple of 32 pixels for interlaced field pictures. The video encoder pads by repeating the last row of the actual video content of the picture (for progressive pictures) or the last two rows (for interlaced video content) to fill the picture out vertically to the next proximate macroblock alignment. The video encoder encodes the frame as the appropriate type at operation 1919. The video encoder finally checks whether the video sequence is to end at the current frame (e.g., based on user input) at operation 1920. If so, the video encoder ends encoding of the sequence. Otherwise, the video encoder returns to acquiring a next picture of the sequence at operation 1914.

Figure 20:
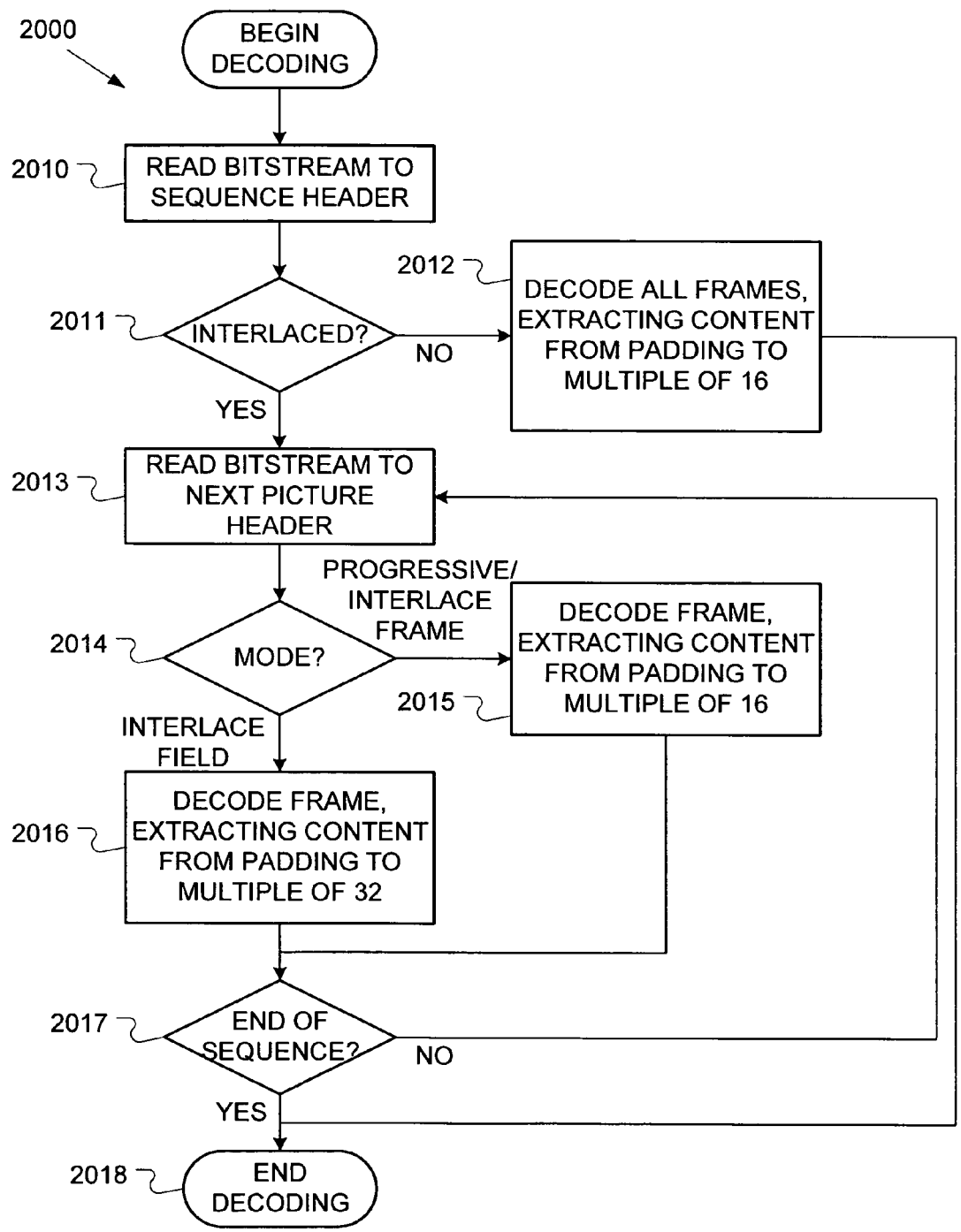
FIG. 20 is a flow diagram of a method utilized in the decoder of FIG. 4 for decoding a hybrid video sequence using adaptive vertical macroblock alignment.

FIG. 20 illustrates operations performed by the video decoder for an adaptive vertical macroblock alignment decoding process 2000 when decoding a mixed video sequence. The diagram is simplified to illustrate the decoding operations relating to adaptive vertical macroblock alignment. It should be apparent to those skilled in the art that the decoding of the video sequence involves many more operations (not otherwise related to adaptive vertical macroblock alignment) as summarized above in the description of the decoder 400 in FIG. 4. Alternative implementations of the video decoder can perform the adaptive vertical macroblock alignment using fewer, more or a different arrangement of operations.

The video decoder begins the decoding by reading the compressed bit stream to the location of the sequence header at operation 2010. The video decoder checks the INTERLACE flag element 820 (FIG. 8) in the sequence header at operation 2011. If this flag is not set (indicating all progressive type frames), the video decoder decodes all frames, including extracting the video content of each frame's picture excluding the padding added to achieve vertical macroblock alignment at a multiple of 16 pixels.

If the interlaced content flag is set, the video decoder instead proceeds to read the picture header of the next frame at operation 2013. Depending on the picture type specified in the picture coding mode (PTYPE) element (FIG. 9-16) of the picture header, the video decoder determines the amount of padding that was used to achieve vertical macroblock alignment.

With reference to FIG. 23, the decoder calculates the padded region of the picture based on the CODED_WIDTH and CODED_HEIGHT elements 1721, 1722 (FIG. 17) specified in the picture header for the frame (or MAX_CODED_WIDTH and MAX_CODED_HEIGHT elements 821, 822 in the sequence header 810 shown in FIG. 8, if no lower coded resolution is specified for the picture), and the frame type (FCM) element 820 in the picture header. The coded resolution values indicate the active frame size 2110 (FIGS. 21A-B) of the picture. Based on the active frame size dimensions and picture type, the decoder calculates the padded frame size 2120 (FIGS. 21A-B) for the frame type (progressive or interlaced) of the picture as shown in the pseudo-code listing 2300 in FIG. 23. For progressive pictures, the horizontal and vertical padded frame dimensions are the next multiple of 16 that is larger than the active frame dimensions. For interlaced pictures, the vertical padded frame size is the next multiple of 32 larger than the active frame height, whereas the padded frame width is the next multiple of 16 larger than the active frame width.

With reference again to FIG. 20, the video decoder then extracts the video content excluding the appropriate amount of padding for the picture type at operations 2015, 2016. However, the decoder may use the decoded padding region of the picture for decoding a subsequent P-Frame or B-Frame (which may have a macroblock or macroblocks with a motion vector pointing to the padding region of a preceding I-Frame).

The video decoder then checks whether the video sequence is ended at operation 2017. If so, the video decoder ends the adaptive vertical macroblock alignment process 2000 at operation 2018. Otherwise, the video decoder returns to decode the next picture header at operation 2013.

V. Efficient Repeat Padding of Hybrid Video Sequences

Figure 22A:
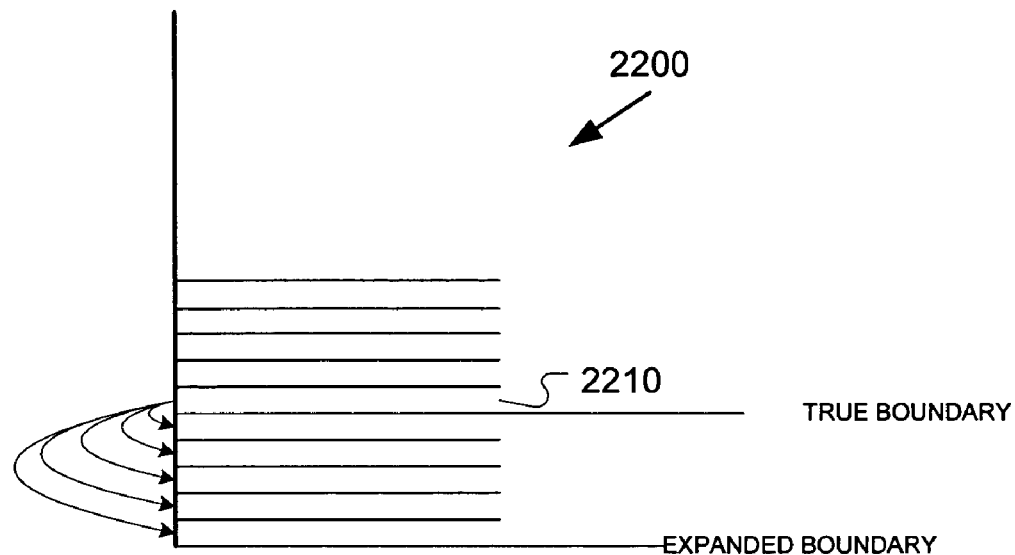
FIGS. 22A-B are diagrams showing repeat padding of progressive and interlaced-type pictures of a hybrid video sequence.
Figure 22B:
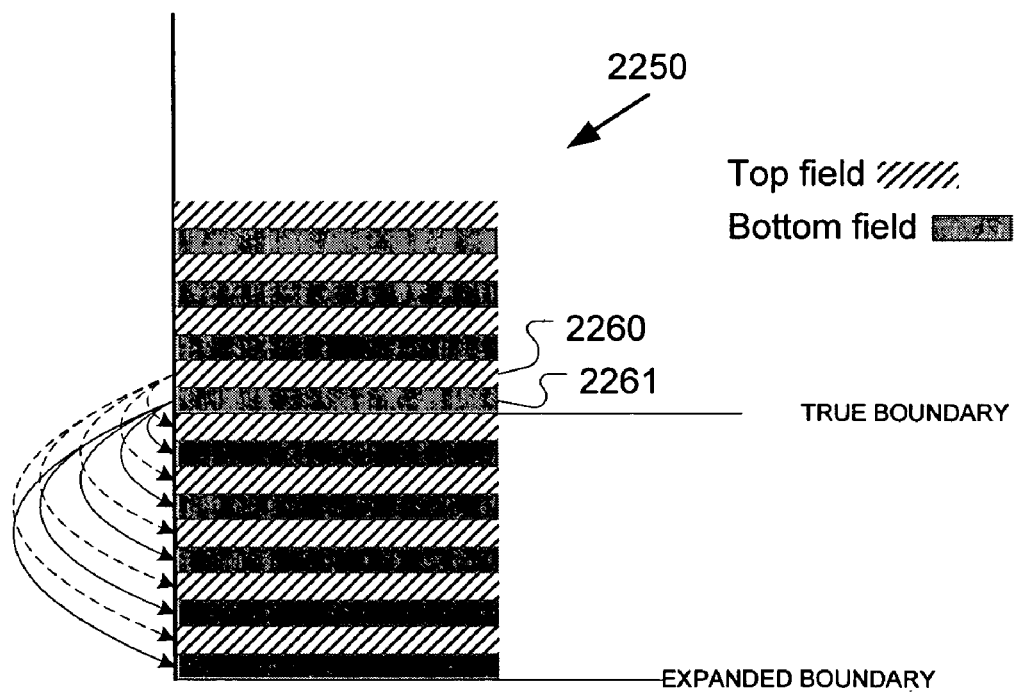

With reference now to FIGS. 22A-B, the repeat padding performed by the video encoder (in operations 2017 and 2018 of the adaptive vertical macroblock alignment process 2000 in FIG. 19) also differs by frame type. For progressive type pictures 2200, the video encoder 300 (FIG. 3) repeats the last row (horizontal boundary or edge) 2210 of the active content in the frame to pad the frame out to the macroblock alignment (i.e., the next multiple of 16). For interlaced (both interlaced field- and interlaced frame-type) pictures 2250, the video encoder repeats the last row of each field of the active content (i.e., the last two rows 2260, 2261 of the active content) to pad the frame out to the macroblock alignment, which is the next multiple of 32 for interlaced field or multiple of 16 for interlaced frame mode pictures. For both progressive and interlaced pictures, the video encoder pads the picture horizontally by repeating the right vertical edge of the active content out to the padded picture size (i.e., the next multiple of 16 for both progressive and interlaced types).

In addition, each picture used as a reference frame for predictive coding is further repeat padded to expand the picture area for purposes of motion estimation and prediction for subsequent predicted (P- and B-) frames. This repeat padding for prediction also differs by frame type. For progressive type pictures 2200, the video encoder 300 (and video decoder at decoding) repeats the last row (horizontal boundary or edge) 2210 of the active content in the frame to an expanded motion estimation region. The first row also is repeated vertically upward to provide an expanded motion estimation region above the picture. For interlaced (both interlaced field- and interlaced frame-type) pictures 2250, the video encoder (and video decoder at decoding) repeats the last row of each field of the active content (i.e., the last two rows 2260, 2261 of the active content) to pad the frame out to the expanded motion estimation region. Similarly, the first two rows are repeated vertically upward to provide expanded motion estimation above the picture. The left and right edges of the coded picture are repeated to expand motion estimation respectively left and right horizontally on both progressive and interlaced pictures. In the illustrated implementation, the expanded motion estimation region for progressive pictures extends 32 pixels horizontally and vertically from the macroblock aligned frame size, and extends 38 pixels horizontally and vertically from the macroblock aligned frame size of interlaced (both frame and field-types) pictures. This expanded motion estimation region is not part of the picture encoded into the compressed bit stream, but simply used as the basis of motion estimation and prediction for coding of the subsequent predicted (P- or B-) frame.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of decoding compressed video containing skip frames using a video decoder, the method comprising:

receiving, at the video decoder, encoded data in a bitstream, wherein the encoded data includes a frame-level bitstream syntax element for a current frame of a video sequence;

with the video decoder, decoding the frame-level bitstream syntax element in accordance with a variable length code table comprising:
- plural codes that indicate a plurality of frame coding types, respectively; and
- a code that indicates a skip frame, wherein, in the case the frame-level bitstream syntax element signals the current frame to be a skip frame, the bitstream lacks further data for decoding the current frame after the frame-level bitstream syntax element for the current frame; and with the video decoder, in the case the frame-level bitstream syntax element signals the current frame to be a skip frame, reconstructing the current frame as a P-frame that is identical to its reference frame, including repeating active picture content from the reference frame to reconstruct the current frame, such that the current frame is identical in content to the reference frame.

2. The method of claim 1 wherein each of the plural codes in the variable length code table is a variable length code for signaling the current frame to be one of at least the frame coding types including an I-frame, a P-frame, a B-frame, and a BI-frame.

3. The method of claim 1 further comprising:
decoding a previous frame-level bitstream syntax element representing a frame mode of the current frame as being progressive or interlaced; and
applying one of at least two repeat padding methods expanding out from the active picture content of the current frame based on the frame mode of the current frame.

4. The method of claim 3 further comprising:
in the case that the frame mode of the current frame is progressive, applying a repeat padding method wherein an edge row of the active picture content is repeated to expand vertically from the active picture content of the current frame.

5. The method of claim 3 further comprising:
in the case that the frame mode of the current frame is interlaced, applying a repeat padding method wherein an edge row of each interlaced field of the active picture content is repeated to expand vertically from the active picture content of the current frame.

6. A method of decoding compressed video containing skip frames using a video decoder, the method comprising:
receiving, at the video decoder, encoded data in a bitstream, wherein the encoded data includes first and second bitstream syntax elements at frame level for a current frame of a video sequence, the first bitstream syntax element representing a coding mode of the current frame, and the second bitstream syntax element representing whether the current frame is a skip frame;
with the video decoder, when decoding the current frame, decoding the first bitstream syntax element and the second bitstream syntax element, wherein the second bitstream syntax element is coded according to a variable length coding table comprising:
- plural codes that indicate a plurality of frame coding types, respectively, and
- a code that indicates a skip frame,
wherein, if the current frame is represented to be a skip frame by the second bitstream syntax element, the bitstream lacks further data for decoding the current frame after the second bitstream syntax element, and otherwise the bitstream includes further data for decoding the current frame after the second bitstream syntax element; and with the video decoder, if the current frame is represented to be a skip frame,
decoding the current skip frame as a P-frame that is identical to its reference frame, including reconstructing active picture content of the current skip frame by copying from active picture content of the reference frame, such that the current skip frame is identical in picture content to the reference frame; and
expanding out from the active picture content of the current skip frame using a form of repeat padding based on the coding mode of the current skip frame.

7. The method of claim 6, wherein the form of repeat padding based on the coding mode being a progressive mode comprises repeating an edge row of the active picture content of the current frame to expand out vertically from the active picture content.

8. The method of claim 6, wherein the form of repeat padding based on the coding mode being an interlaced mode comprises repeating two rows at an edge of the active picture content of the current frame to expand out vertically from the active picture content.

9. The method of claim 6, wherein the second bitstream syntax element is further representative of the current frame being of intra-coding type or predictive-coding type.

10. The method of claim 6, wherein the second bitstream syntax element represents whether the current frame is an I-frame, a P-frame or a skip frame.

11. The method of claim 6, wherein the second bitstream syntax element represents whether the current frame is an I-frame, a P-frame, a B-frame, a BI-frame or a skip frame.

12. A video decoder, comprising:
video bitstream parsing means for reading, from encoded data in a bitstream, a frame-level bitstream syntax element for a current frame in a video sequence;
decoding means for decoding the frame-level bitstream syntax element in accordance with a variable length code table, the variable length code table comprising:
- plural codes that indicate a plurality of frame coding types, respectively; and
- a code that indicates a skip frame, wherein, in the case the current frame is a skip frame, the bitstream lacks further data for decoding the current frame after the frame-level bitstream syntax element for the current frame; and
frame reconstructing means for, in the case the current frame is a skip frame, reconstructing the current frame as a P-frame that is identical to its reference frame, including repeating active picture content from the reference frame, such that the current frame is identical in content to the reference frame.

13. The video decoder of claim 12 wherein each of the plural codes in the variable length code table is a variable length code for signaling the current frame to be one of at least the frame coding types including an I-frame, a P-frame, a B-frame and a BI-frame.

14. The video decoder of claim 12 further comprising:
decoding means for decoding a previous frame-level bitstream syntax element representing a frame mode of the current frame as being progressive or interlaced; and
repeat padding means for applying one of at least two repeat padding methods expanding from the active picture content of the current frame based on the frame mode of the current frame.

15. The video decoder of claim 14 wherein the repeat padding means further comprises:
    means for, in the case that the frame mode of the current frame is progressive, applying a repeat padding method wherein an edge row of the active picture content is repeated to expand vertically from the active picture content of the current frame.

16. The video decoder of claim 14 wherein the repeat padding means further comprises:
    means for, in the case that the frame mode of the current frame is interlaced, applying a repeat padding method wherein an edge row of each interlaced field of the active picture content is repeated to expand vertically from the active picture content of the current frame.

17. A tangible computer readable storage device having a program stored thereon that is executable on a processor to decode compressed video containing skip frames, the program comprising:
    program instructions operating to receive encoded data in a bitstream, wherein the encoded data includes first and second bitstream syntax elements at frame level for a current frame of a video sequence, the first bitstream syntax element representing a coding mode of the current frame, and the second bitstream syntax element representing whether the current frame is a skip frame;
    program instructions operating, when decoding the current frame, to decode the first bitstream syntax element and the second bitstream syntax element, wherein the second bitstream syntax element is coded according to a variable length coding table comprising:
        plural codes that indicate a plurality of frame coding types, respectively, and
        a code that indicates a skip frame,
        wherein, if the current frame is represented to be a skip frame by the second bitstream syntax element, the bitstream lacks further data for decoding the current frame after the second bitstream syntax element, and otherwise the bitstream includes further data for decoding the current frame after the second bitstream syntax element; and
    program instructions operating to, if the current frame is represented to be a skip frame,
        decode the current skip frame as a P-frame that is identical to its reference frame, including reconstructing active picture content of the current skip frame by copying from active picture content of the reference frame, such that the current skip frame is identical in picture content to the reference frame; and
        expand out from the active picture content of the current skip frame using a form of repeat padding based on the coding mode of the current skip frame.

18. The tangible computer readable storage device of claim 17, wherein the form of repeat padding based on the coding mode being a progressive mode comprises repeating an edge row of the active picture content of the current frame to expand out vertically from the active picture content.

19. The tangible computer readable storage device of claim 17, wherein the form of repeat padding based on the coding mode being an interlaced mode comprises repeating two rows at an edge of the active picture content of the current frame to expand out vertically from the active picture content.

20. The tangible computer readable storage device of claim 17, wherein the second bitstream syntax element represents whether the current frame is an I-frame, a P-frame, a B-frame, a BI-frame or a skip frame.

21. The method of claim 1 wherein, in the case the current frame is a skip frame, the bitstream further includes one or more display syntax elements for the current frame that are not used in the decoding of the current frame, the one or more display syntax elements including at least one repeat picture syntax element and at least one pan scan display syntax element.

22. The video decoder of claim 12 wherein, in the case the current frame is a skip frame, the bitstream includes one or more display syntax elements for the current frame that are not used in the decoding of the current frame, the one or more display syntax elements including at least one repeat picture syntax element and at least one pan scan display syntax element.

* * * * *